US012774382B2

(12) United States Patent
Sandoval et al.

(10) Patent No.: US 12,774,382 B2
(45) Date of Patent: Oct. 27, 2026

(54) RANDOM BIPOLYMERS OF CONTROLLED MOLECULAR MASS BASED ON HYDROXYACRYLATES AND THEIR USE AS DESTABILIZERS OF WATER/OIL EMULSIONS IN CRUDE OILS

(71) Applicant: Instituto Mexicano del Petróleo, Mexico City (MX)

(72) Inventors: César Andrés Flores Sandoval, Mexico City (MX); Flavio Salvador Vázquez Moreno, Mexico City (MX); Gerardo Zavala Olivares, Mexico City (MX); Fernando Álvarez Ramírez, Mexico City (MX); Jessica Valeria Fuentes Santiago, Mexico City (MX); Edgar Benedicto Zamora Guerrero, Mexico City (MX); Enrique Cevada Maya, Mexico City (MX)

(73) Assignee: Instituto Mexicano del Petróleo, Mexico City (MX)

( * ) Notice: Subject to any disclaimer, the term of this patent is extended or adjusted under 35 U.S.C. 154(b) by 726 days.

(21) Appl. No.: 18/075,937

(22) Filed: Dec. 6, 2022

(65) Prior Publication Data

US 2023/0348707 A1 Nov. 2, 2023

(30) Foreign Application Priority Data

Apr. 28, 2022 (MX) ......................... /A/2022/005169

(51) Int. Cl.

*C08L 33/14* (2006.01)
*C08F 2/22* (2006.01)

(Continued)

(52) U.S. Cl.

CPC ................ *C08L 33/14* (2013.01); *C08F 2/22* (2013.01); *C08F 20/26* (2013.01); *C08F 220/06* (2013.01);

(Continued)

(58) Field of Classification Search

None

See application file for complete search history.

(56) References Cited

U.S. PATENT DOCUMENTS 5,028,239 A * 7/1991 Stephenson ............ C10G 33/04 210/708
2018/0162975 A1* 6/2018 Hernández Carbajal .................... C08F 220/14

* cited by examiner

*Primary Examiner* — Eli D. Strah
(74) *Attorney, Agent, or Firm* — FisherBroyles, LLP; Jason P. Mueller

(57) ABSTRACT

The present disclosure provide bipolymers, based on alkyl acrylate and hydroxyalkyl acrylate, with high randomness and controlled molecular mass, that are useful as demulsifying and dehydrating agents for crude oil. The synthesis of these bipolymers is carried out in a single stage by emulsion polymerization, a process that, in addition to having moderate reaction conditions, allows the control of the homogeneity of the chain size, the molecular mass, and the demulsifying efficiency. These random bipolymers are soluble in organic phase; therefore, these cannot be carried away by the removed water, and are eliminated in the atmospheric distillation stage. An additional advantage is the superior demulsifying and clarifying efficiency of these random bipolymers compared with the polyether formulations widely used at industrial level. In addition, these random bipolymers provide single molecule that performs three functions: breaker, coalescer and clarifier, in contrast to formulations based on at least three different polyethers.

7 Claims, 10 Drawing Sheets

(51) Int. Cl.
*C08F 20/26* (2006.01)
*C08F 220/06* (2006.01)
*C08F 220/18* (2006.01)
*C10G 33/04* (2006.01)

(52) U.S. Cl.
CPC .. *C08F 220/1804* (2020.02); *C08F 220/1818* (2020.02); *C10G 33/04* (2013.01); *C10G 2300/1033* (2013.01)

RANDOM BIPOLYMERS OF CONTROLLED MOLECULAR MASS BASED ON HYDROXYACRYLATES AND THEIR USE AS DESTABILIZERS OF WATER/OIL EMULSIONS IN CRUDE OILS

CROSS REFERENCE TO RELATED APPLICATIONS

The present application claims priority of Mexican patent application number MX/a/2022/005169 filed Apr. 28, 2022.

TECHNICAL FIELD

The present disclosure relates to the field of chemical products for crude oil conditioning, particularly, to chemical compounds for demulsifying of petroleum, which compounds correspond to bipolymers of alkyl acrylate-hydroxyalkyl acrylate, with a monomeric distribution, high randomness, and controlled molecular mass, and with application of such compounds as agents to destabilize water-in-crude oil (W/O) emulsions, as well as to withdraw the salts dissolved in water, such as crude oils with gravities between 7 and 40° API.

BACKGROUND

Among the biggest problems facing the oil industry is the high stability of water-in-crude oil (W/O) emulsions present in currently extracted crude oils, which are becoming heavier [1]. These emulsions are formed when: (1) there are two immiscible phases, water and crude oil , (2) there is enough agitation or turbulence to form small water droplets that are dispersed in the crude oil, in such a way that, the interfacial force is too large, and therefore, the coalescence of water droplet does not occur because the presence of natural surfactants, such as asphaltenes, resins, naphthenic or organic acids, sulfurs, phenols, fine solids, among others. These natural surfactants promote a high stabilization of the W/O emulsion, generating a physical barrier that hinders the coalescence of water droplets Regarding this last point, the heavy and extra-heavy crude oils present a high amount of these stabilizer agents, making extremely complex the breakdown of W/O emulsions, and therefore, the dehydrating process [2,3]. Currently, the most efficient treatment to destabilize the W/O emulsions and achieve the dehydration of crude oil is the addition of chemical products with demulsifying properties, emulsion breakdown, water droplet coalescence and clarification of the separated aqueous phase. These chemical products are firstly applied from the producing well, subsequently, during the transportation of crude oil and, finally, upon arrival at the refineries, seeking to fulfill the requirements of maximum water and salts content before its processing. Demulsifier agents are also added to the electrostatic desalters.

Among the demulsifying agents commonly used at industrial level are found: polyalkylene glycols, alkoxylated alkylphenol resins and block polyethers based on polypropylene oxide/polyethylene oxide (PPO/PEO) (see references [3]-[8]). In general, all these chemical compounds must be added combined as a formulation containing at least three basic components that confer the properties of emulsion breakdown, accelerated coalescence of the water droplets and clarification of the removed water. Evidently, to obtain the aforementioned formulation, it is necessary to carry out at least three syntheses of polyethers, which are performed under high-pressure (greater than one atmosphere) and high-temperature (T>85° C.) conditions. In addition to the above, there is currently a decrease in the availability of ethylene oxide in several countries, which leads to an increase in the production cost of polyethers. On the other hand, polyethers (such as, block bipolymers, alkydalic and phenolic resins) display a depletion in their dehydrating functions under acid conditions, specifically, during the operations of well production stimulation. This loss of functionalities may be due to the formation of micelles or to the protonation of the ending hydroxyl group of the polyethylene oxide (PEO), provoking the formation of an ending double bond [9], which, indisputably, causes a remarkable decrease in the water removal efficiency in wells or triphasic separators.

Undoubtedly, this effect of chemical instability occurs in ethoxylated products, such as block bipolymers, phenolic resins or nonylphenols. Due to these drawbacks, the oil industry requires the development of novel demulsifying agents with greater efficiency to remove the emulsified water compared with the polyether-based products; additionally, it is necessary that the synthesis procedure will be more affordable, specifically, at less drastic process conditions (e.g., pressure and temperature).

To resolve this demand for greater efficiency in the emulsified water removal present in crude oils, several research groups have opted for the functionalization of the —OH terminal group of polyethers. Such is the case of the functionalization of triblock bipolymers PEO-PPO-PEO to obtain bipolymers α,ω-bifunctionalized with secondary aliphatic or cyclic amines reported in the Mexican patent No. 301344 B [10] and the U.S. Pat. No. 8,815,960 B2 [11], which were evaluated as dehydrating and desalting agents for heavy crude oils. It is important to mention that this procedure for the chemical modification of polyether-based bipolymers was scaled up from laboratory level to bench and semi-industrial levels, as has been described in the patent documents MX No. 368308 B [12], U.S. Pat. No. 10,125,226 B2 [13] and CA No. 2852863 C [14]; where an optimization in the time of total synthesis was highlighted, as well as the number of unit operations at a semi-industrial level in reactors from 1 up to 100 L. Under the same scheme, the U.S. Pat. No. 9,650,577 B2 [15] protects the use of formulation of functionalized block copolymers with ionic liquids to dehydrate crude oils with API gravities between 8° and 30°. Functionalized block copolymer/ionic liquid formulations perform better as emulsified water removers than when the block copolymer or ionic liquid are dosed separately (synergy).

With respect to other types of functionalization, the Mexican patent application No. MX/a/2019/005132 [16] and the U.S. Pat. No. 11,261,282 B2 [17] report new triblock bipolymers with amphoteric endings (functionalized with acrylic derivatives) that are highly efficient as demulsifying agents in crude oils with gravities from 3 to 40° API. These triblock bipolymers with amphoteric endings showed a high emulsion breaking capacity, in addition to inducing a greater coalescence of water droplets when were compared with a commercial formulation. The foregoing provides a better cost/benefit ratio in contrast to conventional commercially available polyether-based formulations; however, the functionalization process involves an additional reaction step [18].

On the other hand, demulsifying agents have been developed starting from chemical compounds and polymers of diverse nature. Among them are found demulsifiers based on hyperbranched polyethyleneimine with palmitoyl chloride endings [19] and hyperbranched demulsifiers based on polyethyleneimine with grafts of saturated fatty acids of different chain lengths [20], which were used for the removal of oil-in-water emulsions. In a similar scheme, Wang et al. reported the synthesis of polyethyleneimines with grafts of ethylene oxide and propylene oxide, soluble in ethanol [21] and their use as efficient breakers of a synthetic water-in-crude oil emulsion (50.2 vol %), prepared from a dry oil with a density of 0.927 g $cm^{-3}$ and 7.99 wt % of asphaltenes. The evaluation was carried out at a dosage of 50 ppm and 65° C., obtaining a water removal around 95 vol % in 1 h. It should be noted that the increase in the concentration of demulsifier did not show a significant effect on the removal efficiency, furthermore, the concentration value at which the coalescence changes was not mentioned. Li et al. described the modification of a polyether derived from tannic acid [22, 23], which displayed a good performance to break down water-in-aged crude oil emulsions (WACO) (density of 0.965 g $cm^{-3}$, 30 vol % of water and 1.97 wt % of asphaltenes), coming from an offshore platform in the Bohai oil field, China.

Regarding polymers based on acrylics, these have been used in many applications such as pressure-sensitive adhesives, biocompatible materials, foundation and waterproof materials [24], for curing coatings [25], as compounds that regulate the release of microorganisms [26], as engineering materials, etc. About specific applications in the oil industry, the U.S. Pat. No. 9,567,509 B2 [27] protects the production of polymeric naphthenate inhibitors by free radical polymerization technique. The monomers comprising these polymers can be an acrylic acid ester monomer and an ionic polyacrylate; additionally, and, in order to promote the affinity to the water/crude oil interface, a third compound can be included such as: styrene, N-vinyl pyrrolidine or 2-hydroxyethyl methacrylate. It is suggested to apply these polymers in crude oils containing mono-naphthenic acids with a molecular weight between 200 and 600 Daltons or in crude oils containing di-, tri- and tetra-naphthenic acids with a molecular weight between 200 and 1400 Daltons. The polymers described in the aforesaid patent document were evaluated at dosages of 10, 100 and 250 ppm, displaying effectiveness in preventing the depletion of the concentration of naphthenic acids in the crude oil, and therefore, effectiveness in inhibiting the formation of calcium naphthenate, by measuring the interfacial film and the viscosity index.

On the other hand, the patents MX No. 383630 B [28], U.S. Pat. Nos. 10,982,031 B2 [29], and 10,221,349 B2 [30] report copolymers and terpolymers as silicon-free antifoaming agents for heavy and extra-heavy crude oils. These defoamers showed excellent performance compared with a silicone-based defoamer when were added at concentrations between 500 and 250 ppm.

In addition to the previously mentioned applications, the use of polymers based on acrylics as clarifiers of removed water in oil-in-water (O/W) emulsions is described in the U.S. Pat. No. 9,981,207 B2 [31]; where it is protected polymers based on polyalkylacrylamide, which could be homopolymers or copolymers employing one or more acrylic-based monomers, such as acrylic acid, acrylamides, hydroxyalkyl acrylates, alkoxyalkyl acrylates, aminoalkyl acrylates; at different mass proportions. These polymers can be used in concentrations from 0.25 to 10,000.00 ppm as demulsifying agents, specifically for crude oil-in-water emulsions and as clarifiers of the extracted water during dehydration process. However, the document does not provide information about the characteristics of the aqueous/organic systems that these polymers can treat.

Additionally, the U.S. Pat. No. 11,001,764 B2 [32] presents the use of copolymers based on acrylamide and poly (ethylene glycol) methyl ether methacrylate, as well as the use of a copolymer of these two monomers and (3-acrylamidopropyl)-trimethylammonium chloride as destabilizers of O/W emulsions, but mainly, as clarifiers of removed water. For this reason, these copolymers are soluble in the aqueous phase or dispersed in polar organic solvents such as alcohols, glycols, acetone, acetic acid or a mixture of these. These polymers are constituted of a first monomer that can be some polyalkyl glycol acrylate and a second monomer with an acrylamide, hydroxyalkyl acrylic or aminoalkyl acrylic group. Additionally, the resulting copolymer is copolymerized with a third aminoacrylic monomer containing ammonium chloride or ammonium hydroxide. It should be noted that the patent document indicates the use of 150 ppm of the polymer described above as a clarifying agent, while the TRETOLITE™ DMO8663X formulation from Baker Hughes Incorporated, is employed as a demulsifying agent, although the employed concentration is not specified.

The US patent application document No. 2020/0056105 A1 [33] mentions the use of water-removed clarifying agents in crude oil-in-water emulsions, whose composition comprises a dispersion in latex form of an anionic polymer consisting of at least: (1) an α,β-ethylene unsaturated carboxylic acid monomer or a vinyl ester monomer, (2) an α,β-ethylene unsaturated nonionic monomer, (3) optionally, a nonionic vinyl ester surfactant or a nonionic α,β-ethylen unsaturated of longer chain than the monomer 2, and a urethane monomer, and (4) optionally, a cross-linking agent which may be a chelating agent, a base or an alcohol. These water clarifiers were qualitatively evaluated in an emulsion at 1% of ADCO crude oil by bottle test with a weighting from 1 to 5, where 5 is the maximum clarification; the authors report that all compounds present a maximum clarification when were evaluated at a concentration of 200 ppm. However, nowhere in the document is mentioned the API gravity of the employed crude oil in this patent application document.

Continuing with the applications in the oil industry, specifically in relation to dehydrating agents for water-in-crude oil (W/O) emulsion, in the U.S. Pat. No. 4,968,449 [34] is described the polymerization of vinylic monomers in the presence of an initiator to form a vinyl polymer with a site capable of being alkoxylated; thus, the vinyl polymer can be reacted with at least one alkylene oxide (EO, PO, BO or alike) or esterified with block polymers of such oxides. It should be noted that the synthesized demulsifier is a mixture of demulsifying polymers based on vinyl alkoxylated, non-alkoxylated, oxyalkylated and inorganic, which are used to break down water-in-crude oil emulsions. The performance of the described polymers in this patent document was evaluated by bottle test; however, the employed concentration was not reported, furthermore, the performance was rated by the coalescence speed and total dehydration on a numerical scale from 0 to 4, where 4 represents the best performance.

Regarding polymers based on alkyl acrylic, these have also been used as breakers of water-in-crude oil (W/O) emulsions, because they present an excellent alternative to replace commercial formulations based on polyethers.

In this sense, the U.S. Pat. No.10,793,783 B2 [35] and the Canadian patent No. 3,013,494 C [36] protect random copolymers based on alkyl acrylic-carboxyalkyl acrylic of controlled molecular mass, where one of the monomers must necessarily be a monomer of the carboxyalkyl acrylic type; moreover, the resulting copolymers have average molecular masses between 900 and 472500 g $mol^{-1}$. It is important to mention that these random copolymers showed excellent performance as breakers, coalescers and clarifiers in crude oils with API gravities from 5 to 40°, when were dosed between 1500 and 500 ppm; being more efficient than the FDH-1 commercial formulation—based on polyethers—. Therefore, a single basic possesses all three desired properties of a demulsifying agent. Finally, the authors point out that the molecular characteristics, composition, and molecular mass of the copolymers can be adjusted according to the properties of each crude oil, and thus, optimizing their efficiency as dehydrating agents.

Similarly, the Mexican patent No. 386485 B [37] and the U.S. Pat. No. 10,975,185 B2 [38] report the application of random copolymers based on alkyl acrylic-amino alkyl acrylic as demulsifying agents for crude oils with gravities between 10 and 40° API, synthesized by emulsion polymerization. These copolymers showed higher efficiencies than a commercial formulation based on polyethers at a dosage of 1000 and 500 ppm, standing out for the excellent clarification of the removed water and the homogeneity in the rupture. The authors highlight the integration of the three properties required in a demulsifier (breaker, coalescer and clarifier) in a single synthesized product (basic).

In the undergraduate thesis entitled "Synthesis of copolymers based on alkyl acrylate via emulsion polymerization as demulsifying agents in Mexican heavy crude oils", Palacios, N., (2015) [39] is described the synthesis, characterization, and evaluation of copolymers using as a basis a linear-chain alkyl acrylate monomer and a branched alkyl acrylate monomer with a ratio of 70/30 y 30/70% wt/wt; respectively, and different molecular mass. These copolymers were dosed at concentrations from 3000 to 500 ppm in a crude oil with gravity of 10.24° API and compared with a commercial ionic liquid. The results demonstrate a dependence of the demulsifying efficiency with the molecular mass of copolymers.

In the same line of research, the Mexican patent application No. MX/a/2020/011505 [40] and the US patent application No. 20220135886 A1 [41] protect bipolymers capable of removing emulsified water in mixtures of crude oils with API gravities from 4° to 35°, dosed up to 25 ppm. It should be noted that these polymers, even though they are highly random, are synthesized based on ethylene alkanoate-acrylic monomers.

Meanwhile, the Mexican patent application No. MX/a/2021/008781 [42] reports macromolecules comprised of hydrophobic (alkyl) and hydrophilic (alkoxyalkyl) acrylates, employed as removers of water-in-crude oil (W/O) emulsions, which when dosed at concentrations between 1500 and 500 ppm, showed excellent performance as emulsion breakers, water droplet coalescers and removed water clarifiers because of the excellent solubility in crude oil.

SUMMARY

This summary is intended to introduce the subject matter of the present disclosure, but does not cover each and every embodiment, combination, or variation that is contemplated and described within the present disclosure. Further embodiments are contemplated and described by the disclosure of the detailed description, drawings, and claims.

The present disclosure relates to novel random bipolymers (based on alkyl acrylate-hydroxyalkyl acrylate monomers) of high randomness and with controlled molecular mass. The random bipolymers have advantageous properties as demulsifying agents for water-in crude oil (W/O) emulsions, such as W/O emulsions in crude oils with gravities between 7 and 40° API.

In at least one embodiment, the bipolymers useful as demulsifying and dehydrating agents are based on alkyl acrylate-hydroxyalkyl acrylate random polymers having structural formula (1) below:

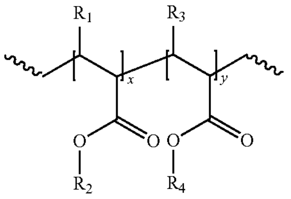

(1)

wherein:

$R_1$, $R_2$, $R_3$ and $R_4$ are independent radicals, and represent chemical groups as follows:

$R_1$ and $R_3$ are independently selected from H (hydrogen), and $CH_3$ (methyl);

$R_2$ is independently selected from $CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di (ethylene glycol)ethylether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylcyclohexyl), $C_{12}H_{25}$ (n-dodecyl), $C_{18}H_{37}$ (n-octadecyl), $C_5H_9O$ (tetrahydrofurfuryl), $C_5H_9O$ (2-tetrahydropyranyl), $C_{13}H_{27}$ (tridecyl), and $C_{22}H_{45}$ (behenyl). Generally, the $R_2$ group aliphatic chain can include up to 35 carbon atoms, as well as heteroatoms of the ether group or benzene type aromatic rings;

$R_4$ is independently selected from: $CH_2OH$ (hydroxymethyl), $C_2H_4OH$ (2-hydroxyethyl), $C_3H_6OH$ (3-hydroxypropyl), $C_4H_8OH$ (4-hydroxybutyl), $C_5H_{10}OH$ (5-hydroxyphenyl), $C_6H_{12}OH$ (hydroxyhexyl), $C_7H_{14}OH$ (hydroxyheptyl) $C_8H_{16}OH$ (hydroxyoctyl), $C_9H_{18}OH$ (hydroxynonyl), $C_{10}H_{20}OH$ (10-hydroxydecyl), $C_{11}H_{22}OH$ (11-hydroxyundecyl), and $C_{12}H_{24}OH$ (12-hydroxydodecyl). Generally, the $R_4$ hydroxyalkyl monomer can include an alkyl group of cyclic or branched-chain from $C_1$ to $C_{22}$. wherein also:

x is a number from about 1 to about 6300;

y is a number from about 1 to about 6300; and wherein the polymeric subunit of x alkyl-acrylate monomers and the polymeric subunit of y hydroxy-alkyl-acrylate monomers can be present in any order.

In at least one embodiment, the random bipolymers of structural formula (1) have number average molecular masses ($\overline{M}_n$) ranging from about 2800 to 638000 g $mol^{-1}$.

The present disclosure also provides production processes and uses of the random bipolymers as demulsifying agents. Generally, random bipolymers (or copolymers) are synthesized by combining two different monomers in the polymerization reaction. The resulting bipolymer includes in a statistical distribution of polymeric subunits of the two different monomers along the polymer chain. See e.g., references [48], [50], [51], and [52]. The random bipolymers of the present disclosure, based on alkyl acrylate-hydroxyalkyl acrylate monomers, can be synthesized in a single stage, and due to their chemical nature, have good qualities as emulsion breakers, water droplet coalescers and removed water clarifiers. Without intending to be bound by any theory or mechanism, it is believed that the presence of a hydroxyl group in the structure of the hydroxyalkyl acrylate monomer (i.e., the "hydrophilic monomer"), confers to the novel random bipolymer of the present disclosure a different chemical activity from those polymers mentioned in the background section.

The synthesis of the bipolymers of the present disclosure is carried out by semi-continuous emulsion polymerization, under starved-feed conditions. This synthesis method was developed at the Mexican Petroleum Institute, and is disclosed in (and protected by) Mexican patent Nos. 338861 B [43], 378417 B [44], and 386485 B [37], in Canadian patent Nos. 3013494 C [36] and 2872382 C [47], and U.S. Pat. Nos. 9,120,885 B2 [45], 10,221,349 B2 [30], 10,793,783 B2 [35], 10,975,185 B2 [38], and 10,213,708 B2 [46], each of which is hereby incorporated by reference herein.

In at least one embodiment of the present disclosure, the synthesis of the bipolymer is carried out wherein the weight ratio of alkyl acrylate and hydroxyalkyl acrylate monomers is adjusted so that the obtained bipolymer could be soluble in the crude oil, which was achieved by always keeping the alkyl acrylate monomer (i.e., the "hydrophobic monomer") in a higher weight proportion.

The average molecular mass of the bipolymeric chains can be controlled by adding a chain transfer agent to the synthesis. Chain-transfer agents useful for synthesis of random bipolymers based on alkyl acrylate-hydroxyalkyl acrylate monomers are well known in the art, see e.g., references [48] and [49]. As described elsewhere herein, the average molecular mass ratio can has a great influence on the efficiency of the dehydration process of light, heavy and extra-heavy crude oils, and there are preferred bipolymer mass ranges for each of these crude oil types. The bipolymers of the present disclosure have high chemical stability under acid conditions (pH=2), without undergoing chemical degradation as occurs in the commercial formulations based on polyethers, which, when are protonated and chemically degraded, lose their activity as demulsifying agent. Therefore, the novel bipolymers based on alkyl acrylate-hydroxyalkyl acrylate monomers keep up their efficiency as demulsifying agents in neutral or acid conditions, avoiding the overdosing of chemical agents and the problems associated with the presence of water in the crude oil when commercial formulations are employed.

BRIEF DESCRIPTION OF THE DRAWINGS

A better understanding of the novel features and advantages of the present disclosure will be obtained by reference to the following detailed description that sets forth illustrative embodiments, in which the principles of the disclosure are utilized, and the accompanying drawings (also "Figure" and "FIG." herein), of which.

DETAILED DESCRIPTION

Figure 1:
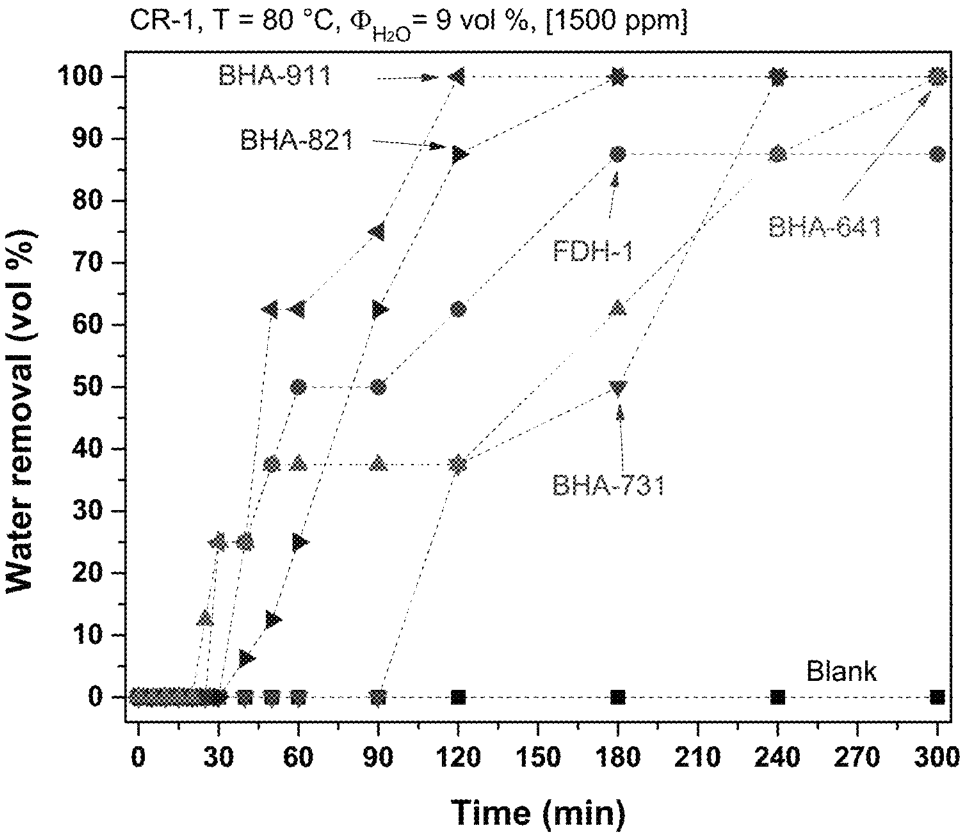
FIG. 1 shows the performance of random bipolymers based on alkyl acrylate-hydroxyalkyl acrylate as demulsifying agents, which were synthesized with different monomeric weight ratio and with 1 wt % of chain transfer agent, in order to be compared with the FDH-1 commercial formulation based on polyethers. The demulsifying agents were evaluated in the CR-1 heavy crude oil of 21.0° API at a dosage of 1500 ppm.

The present disclosure provides novel bipolymers (based on alkyl acrylate and hydroxyalkyl acrylate monomers) and with high randomness and controlled molecular mass to be employed as demulsifying and dehydrating agents, in order to break down water-in-crude oil emulsions and remove the emulsified water and the salt dissolved in this last one, specifically, in the separation units set for crude oils (inshore and offshore) with gravities from 7 to 40° API. The random bipolymers based on alkyl acrylate-hydroxyalkyl acrylate of the present disclosure useful as demulsifying and dehydrating agents have structural formula (1) below:

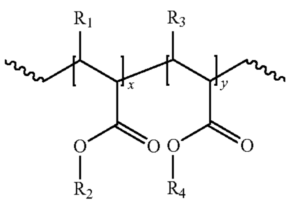
(1)

wherein:

- $R_1$, $R_2$, $R_3$ and $R_4$ are independent radicals, and represent chemical groups as follows:
- $R_1$ and $R_3$ are independently selected from H (hydrogen), and $CH_3$ (methyl);
- $R_2$ is independently selected from $CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di (ethylene glycol)ethylether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylcyclohexyl), $C_{12}H_{25}$ (n-dodecyl), $C_{18}H_{37}$ (n-octadecyl), $C_5H_9O$ (tetrahydrofurfuryl), $C_5H_9O$ (2-tetrahydropyranyl), $C_{13}H_{27}$ (tridecyl), and $C_{22}H_{45}$ (behenyl). Generally, the $R_2$ group aliphatic chain can include up to 35 carbon atoms, as well as heteroatoms of the ether group or benzene type aromatic rings;
- $R_4$ is independently selected from: $CH_2OH$ (hydroxymethyl), $C_2H_4OH$ (2-hydroxyethyl), $C_3H_6OH$ (3-hydroxypropyl), $C_4H_8OH$ (4-hydroxybutyl), $C_5H_{10}OH$ (5-hydroxyphenyl), $C_6H_{12}OH$ (hydroxyhexyl), $C_7H_{14}OH$ (hydroxyheptyl) $C_8H_{16}OH$ (hydroxyoctyl), $C_9H_{18}OH$ (hydroxynonyl), $C_{10}H_{20}OH$ (10-hydroxydecyl), $C_{11}H_{22}OH$ (11-hydroxyundecyl), and $C_{12}H_{24}OH$ (12-hydroxydodecyl). Generally, the $R_4$ hydroxyalkyl monomer can include an alkyl group of cyclic or branched-chain from $C_1$ to $C_{22}$;

wherein also:

- x is a number from about 1 to about 6300;
- y is a number from about 1 to about 6300; and
- wherein the polymeric subunit of x alkyl-acrylate monomers and the polymeric subunit of y hydroxyalkyl-acrylate monomers can be present in any order.

The random bipolymers typically have number average molecular masses ($\overline{M}_n$) ranging from about 2800 to 638000 g $mol^{-1}$.

The present disclosure also provides processes to synthesize and formulate the novel bipolymers, and methods for their use. The dehydrating agents based on the alkyl acrylate-hydroxyalkyl acrylate bipolymers of the present disclosure can be synthesized as latexes using semi-continuous emulsion polymerization, making up firstly a pre-emulsion in an addition tank according to the following proportions: the alkyl acrylate monomer is set up on an interval between about 55.0 and 99.0 wt % and the hydroxyalkyl acrylate monomer is set up on an interval from about 1.0 to 45.0 wt %. The higher proportion of alkyl acrylate monomer confers to the random acrylic bipolymer a higher diffusion in the crude oil, which allows reaching the interface of the water droplet. Once the polymerization reaction is completed, the random acrylic bipolymer in latex form is submitted to a distillation process at a temperature between about 60 and 100° C., in order to obtain a viscous liquid, which is dissolved in an adequate organic solvent with boiling points between about 30 and 250° C., such as: dichloromethane, methanol, ethanol, isopropanol, chloroform, acetone, dimethylsulfoxide, tetrahydrofuran, benzene and its derivatives, toluene, xylene, aromatic amines, jet fuel, and naphtha; individually or as a mixture, for its final application as demulsifying agent of crude oils with gravities ranging from about 7 to 40° API. The concentration of the random bipolymer in the solution is set up on an interval from about 3.0 to 55.0 wt %; whereas the solution dosage in the crude oil can be set up on an interval of concentrations from about 10 to 2000 ppm.

Alkyl Acrylate-Hydroxyalkyl Acrylate

Alkyl acrylate monomers useful for the synthesis of the bipolymers of the present disclosure include, but are not limited to: methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate and behenyl methacrylate.

Hydroxyalkyl acrylate monomers useful for the synthesis of the bipolymers of the present disclosure include, but are not limited to: hydroxymethyl acrylate, 2-hydroxyethyl acrylate, 3-hydroxypropyl acrylate, 4-hydroxybutyl acrylate, 5-hydroxypentyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 11-hydroxyundecyl acrylate, 12-hydroxydodecyl acrylate, hydroxymethyl methacrylate, 2-hydroxyethyl methacrylate, 3-hydroxypropyl methacrylate, 4-hydroxybutyl methacrylate, 5-hydroxypentyl methacrylate, 6-hydroxyhexyl methacrylate, 7-hydroxyheptyl methacrylate, 8-hydroxyoctyl methacrylate, 9-hydroxynonyl methacrylate, 10-hydroxydecyl methacrylate, 11-hydroxyundecyl methacrylate, 12-hydroxydodecyl methacrylate.

The random acrylic bipolymers of the present disclosure can be dosed in effective quantities ranging from 10 to 2000 ppm in crude oils with gravities from 7 to 40° API, in order to remove the emulsified water and the dissolved salts.

EXAMPLES

Various features and embodiments of the disclosure are illustrated in the following representative examples, which are intended to be illustrative, and not limiting. Those skilled in the art will readily appreciate that the specific examples are only illustrative of the inventions described more fully in the claims which follow thereafter. Every embodiment and feature described in the application should be understood to be interchangeable and combinable with every embodiment contained within.

The following examples are shown to illustrate the spectroscopic characteristic of the random bipolymers based on alkyl acrylate-hydroxyalkyl acrylate as dehydrating agents in crude oils with gravities from about 7 to 40° API. These examples must not be considered as limitation of what is claimed here.

Exemplary bipolymers (based on alkyl acrylate-hydroxyalkyl acrylate) of the present disclosure were synthesized, dried, and characterized using the following instrumental methods:

1. Size exclusion chromatography (SEC) was carried out in order to obtain the number average molecular masses of bipolymers, as well as their polydispersity indexes (I). An Agilent™ model 1100 size exclusion chromatograph with a PLgel column was employed, using tetrahydrofuran (THF) as eluent.
2. Fourier transform infrared spectroscopy (FTIR) was used in order to qualitatively identify the functional groups present in random acrylic bipolymers. A Thermo Nicolet™ AVATAR 330 Fourier transform infrared spectrometer was utilized to record the spectra, employing the film technique with a KBr film. The OMNIC™ 7.0 software was used for the processing of spectra.
3. Nuclear magnetic resonance (NMR) was obtained in order to identify the characteristic chemical shifts of random acrylic bipolymers. A Bruker AVANCE NEO spectrometer was used to record the $^1H$ and $^{13}C$ spectra at frequencies of 600 MHz and 150 MHz, respectively. A solution in deuterated chloroform ($CDCl_3$) of each bipolymer was prepared, considering the tetramethylsilane (TMS) as reference.

Exemplary bipolymers of high randomness based on alkyl acrylate-hydroxyalkyl acrylate of the present disclosure were obtained, and their average molecular mass was determined by SEC, as well as their spectroscopic characteristics of alkyl acrylate-hydroxyalkyl acrylate as shown below in Tables 1, 2, and 3.

Table 1 reports the results for the poly(alkyl acrylate-hydroxyalkyl acrylate) ($R_1$ and $R_3$=hydrogen, $R_2$=n-butyl $R_3$=2-hydroxyethyl) corresponding to the BHA-1 series.

TABLE 1

Number average molecular mass ($\overline{M}_n$) and polydispersity index (I) obtained by SEC for the alkyl acrylate-hydroxyalkyl acrylate bipolymer with different monomeric weight ratio and with 1 wt % of chain transfer agent (BHA-1 series).

| Bipolymer | Weight ratio (% wt/wt) | $\overline{M}_n$ (g mol$^{-1}$) | Polydispersity index (I) |
|---|---|---|---|
| BHA-911 | 90/10 | 17 080 | 1.98 |
| BHA-821 | 80/20 | 18 061 | 1.67 |
| BHA-731 | 70/30 | 18 215 | 1.40 |
| BHA-641 | 60/40 | 18 950 | 1.35 |

Table 2 displays the results for the poly(alkyl acrylate-hydroxyalkyl acrylate) ($R_1$ and $R_3$=hydrogen, $R_2$=n-butyl $R_3$=2-hydroxyethyl) corresponding to the BHA-2 series.

TABLE 2

Number average molecular mass ($\overline{M}_n$) and polydispersity index (I) obtained by SEC for the alkyl acrylate-hydroxyalkyl acrylate bipolymer with different monomeric weight ratio and with 2 wt % of chain transfer agent (BHA-2 series).

| Bipolymer | Weight ratio (% wt/wt) | $\overline{M}_n$ (g mol$^{-1}$) | Polydispersity index (I) |
|---|---|---|---|
| BHA-912 | 90/10 | 14 210 | 1.81 |
| BHA-822 | 80/20 | 13 120 | 1.50 |
| BHA-732 | 70/30 | 12 870 | 1.38 |
| BHA-642 | 60/40 | 11 590 | 1.23 |

Table 3 exhibits the results for the poly(alkyl acrylate-hydroxyalkyl acrylate) ($R_1$ and $R_3$=hydrogen, $R_2$=n-butyl $R_3$=2-hydroxyethyl) corresponding to the BHA-4 series.

TABLE 3

Number average molecular mass ($\overline{M}_n$) and polydispersity index (I) obtained by SEC for the alkyl acrylate-hydroxyalkyl acrylate bipolymer with different monomeric weight ratio and with 4 wt % of chain transfer agent (BHA-4 series).

| Bipolymer | Weight ratio (% wt/wt) | $\overline{M}_n$ (g mol$^{-1}$) | Polydispersity index (I) |
|---|---|---|---|
| BHA-914 | 90/10 | 12 045 | 1.76 |
| BHA-824 | 80/20 | 10 996 | 1.67 |
| BHA-734 | 70/30 | 9 860 | 1.29 |
| BHA-644 | 60/40 | 8 437 | 1.06 |

BHA-1 Series

Bipolymers of high randomness and controlled molecular mass based on alkyl acrylate-hydroxyalkyl acrylate.

FT-IR. v cm$^{-1}$: 3450, 2960, 2931, 2870, 1732, 1453, 1395, 1249, 1167, 1071, 1020, 946.

$^1H$ NMR δ (ppm): 4.19, 4.04, 3.80, 2.28, 1.62, 1.60, 1.38, 0.94.

$^{13}C$ NMR δ (ppm): 174.54, 66.51, 64.43, 60.61, 41.37, 36.27, 35.25, 34.37, 30.61, 19.10, 14.14, 13.74.

Evaluation of the Bipolymers as Dehydrating Agents in Crude Oils with Gravities from 7 to 40° API Each one of the exemplary bipolymers was dissolved in a solvent as dichloromethane, methanol, ethanol, isopropanol, chloroform acetone, dimethyl sulfoxide, tetrahydrofuran, dioxane, benzene and its derivatives, toluene, xylene, aromatic amines, jet fuel, or naphtha, in order to prepare concentrated dissolutions of each random bipolymer, from about 3.0 to 55.0 wt %. In each case, an aliquot of the demulsifying was added at a specific concentration, comprised in the interval from about 10 to 2000 ppm, to avoid any influence of the solvent on the destabilization of the emulsion and, consequently, in amount of removed water from the assessed crude oil. Random bipolymers based on acrylic were simultaneously assessed, comparing its performance with the FDH-1 commercial dehydrating formulation, which is widely employed in the oil industry. This formulation is comprised of four ethylene oxide-propylene oxide-ethylene oxide triblock bipolymers (PEO-PPO-PEO) of different molecular mass and with a propylene oxide/ethylene oxide weight ratio (PO/EO) of 90/10 (7,750 g $mol^{-1}$), 70/30 (5,330 g $mol^{-1}$), 60/10 (3,050 g $mol^{-1}$) and 90/10 (1,400 g $mol^{-1}$).

The assessment to determine the amount of removed water was carried out by bottle test, following the procedure described in the Mexican patent document No. 386485 B [37], in the Canadian patent No. 3013494 C [36], and in the U.S. Pat. Nos. 10,793,783 B2 [35] and 10,975,185 B2 [38], where a bottle with untreated crude oil (crude oil without the demulsifying product, labeled as blank), a bottle for each random bipolymer based on alkyl acrylate-hydroxyalkyl acrylate, and a bottle for the FDH-1 commercial formulation are taken into account. An aliquot of the dissolution of random bipolymer based on alkyl acrylate-hydroxyalkyl acrylate and the FDH-1 commercial formulation, considering the dosage to assess, was added to each bottle; subsequently, the crude oil was poured into until the mark of 100 mL. Once the filling of the bottles is finished, the first read was taken without manual agitation of the bottles, which was called time zero. The bottles were then placed into a thermal controlled bath, and the breakdown of the water-in-crude oil (W/O) emulsion was regularly measured during the 5 h of assessment.

Table 4 displays the physicochemical characterization and properties of the employed crude oils on the assessment of the random bipolymers based on alkyl acrylate-hydroxyalkyl acrylate of controlled molecular mass as demulsifying agents.

TABLE 4

Physicochemical characterization and properties of crude oils subjected to dehydration.

| Property | CR-1 | CR-2 | CR-3 | CR-4 | CR-5 |
|---|---|---|---|---|---|
| API gravity (°) | 21.0 | 7.6[a] | 13.6 | 37.3 | 15.2 |
| Salt content (lb $mbb^{-1}$) | 19[b] | 42 176[b] | 6 800[b] | 30 | >151 |
| Paraffins content (wt %) | 51.4 | 0.91 | 3.39 | 2.21 | 3.76 |
| Runoff temperature (° C.) | −24 | +24 | −12 | <−51 | −33 |
| Water content by distillation (vol %) | 9.0 | 67.0 | 21.0 | 50.0 | 30.0 |
| Water and sediments (vol %) | 9.1 | 69.0 | 21.2 | 54.0 | 30.1 |
| Kinematic viscosity ($mm^2$ $s^{-1}$) @ 25° C. | 275.2 | —[c] | 4402 | 5.9 | 335.5[d] |
| Number average molecular mass by cryoscopy (g $mol^{-1}$) | 367 | 1375 | 500 | 214 | 375 |
| Saturates (wt %) | 34.93 | 31.37 | 6.60 | 47.78 | 51.53 |
| Aromatics (wt %) | 32.83 | 33.48 | 30.12 | 38.90 | 13.93 |
| Resins (wt %) | 22.56 | 22.54 | 45.90 | 12.05 | 19.50 |
| Asphaltenes (wt %) | 9.52 | 12.53 | 17.33 | 1.19 | 15.04 |

[a]Apparent gravity.
[b]The sample was diluted.
[c]The results are out of method.
[d]Kinematic viscosity at 40° C.

As demonstration, FIGS. 1, 3, 5, 7, 9, and 10 show the results of the water removal efficiency of the random bipolymers of controlled molecular mass based on alkyl acrylate and hydroxyalkyl acrylate, whereas FIGS. 2, 4, 6, and 8 display the bottle images and the micrographs of crude oil after the assessment.

FIG. 1 shows the demulsifying performance of the random bipolymers based on alkyl acrylate-hydroxyalkyl acrylate, synthesized with different monomeric weight ratio and 1 wt % of chain transfer agent, in the CR-1 crude oil (21.0° API) at a dosage of 1500 ppm. As can be observed, all the random bipolymers of BHA-1 series reached the total removal of emulsified water. The BHA-911 bipolymer presents the highest coalescence rate, being the first one to reach 100 vol % at 120 min, despite having started the breakdown of the emulsion at 40 min. On the other hand, the BHA-821 bipolymer showed a lower coalescence rate than the BHA-911 bipolymer; however, it achieved the total removal at 180 min followed by the BHA-731 bipolymer, which, despite having initiated the breakdown at 120 min and presented the lowest coalescence rate during the first 180 min of the assessment, reached the total removal at 240 min. Finally, although the BHA-641 bipolymer presented the best performance as emulsion breaker, managing to destabilize it at 25 min of the assessment; it presented a lower coalescence rate, being the last random bipolymer to achieve 100 vol % of emulsified water removal. It is worth highlighting that all random bipolymers of BHA-1 series outperform the FDH-1 commercial formulation, which achieved a maximum removal of 88 vol % at 180 min of the assessment.

Figure 2:
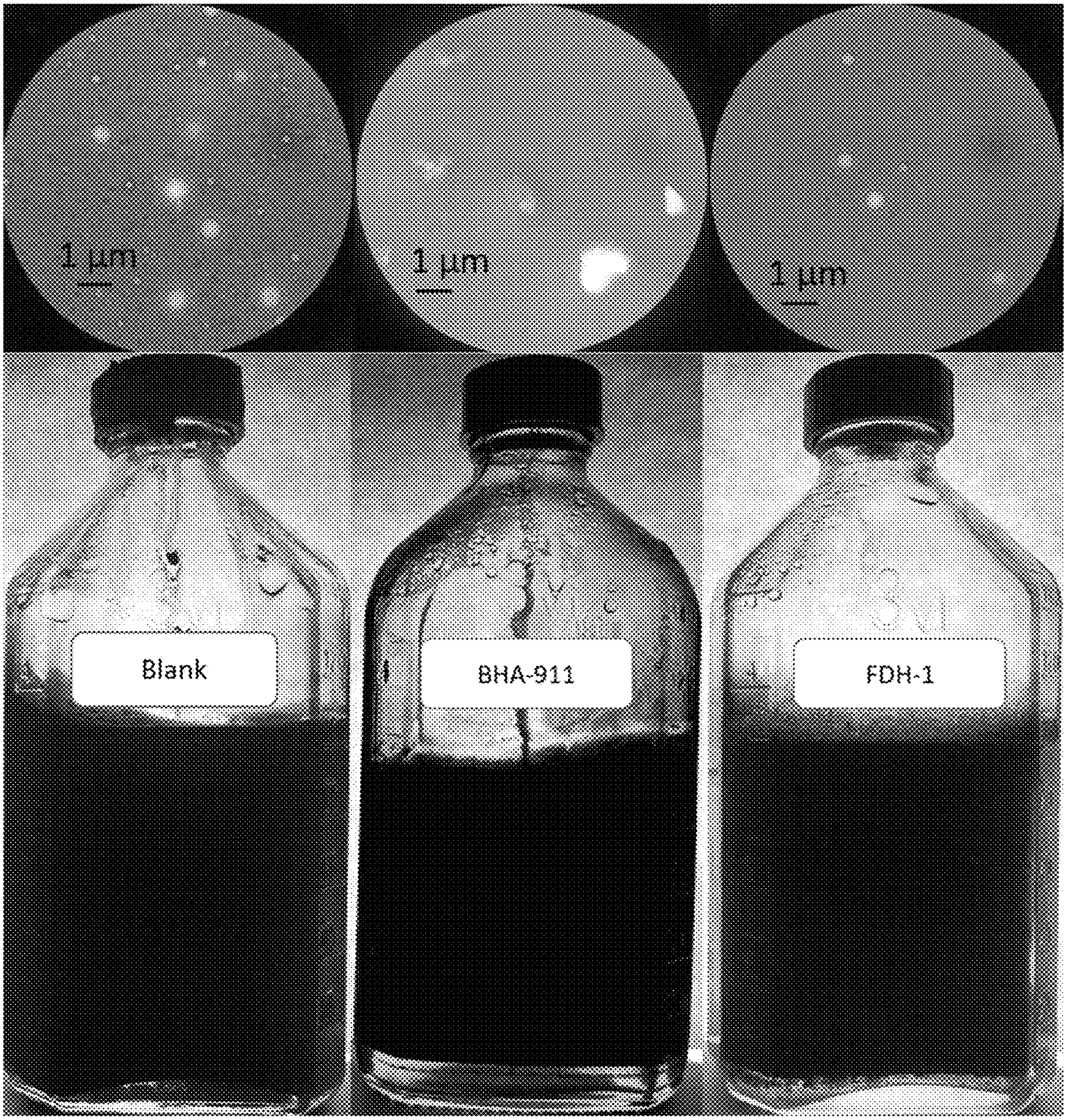
FIG. 2 displays the images of the bottles and the micrographs of crude oil samples after the assessment of the random bipolymers based on alkyl acrylate-hydroxyalkyl acrylate in the CR-1 heavy crude oil of 21.0° API. The untreated crude oil sample (without demulsifying agent, labeled as blank) is compared with the BHA-911 random bipolymer which exhibits the highest coalescence rate, reaching 100 vol % in less time than the rest of the BHA bipolymer—, and with the FDH-1 commercial formulation (88 vol %).

FIG. 2 shows the bottles images and micrographs of the CR-1 crude oil after the treatment with the BHA-911 bipolymer—first one on reaching 100 vol % of removed water—and with the FDH-1 commercial formulation—88 vol %—, which were compared with the crude oil without demulsifying agent (blank). Firstly, in the blank bottle was not observed the presence of removed water, therefore, the water-in-crude oil emulsion is highly stable under the assessment conditions. For its part, in the image of the bottle of crude oil treated with the BHA-911 bipolymer is observed a removed water—crude oil interface completely homogeneous compared with the crude oil treated with the FDH-1 commercial formulation. Additionally, a greater clarification of the separated water is notable when the BHA-911 is used (which is similar to the rest of bipolymers of the BHA-1 series, although the bottles are not shown in FIG. 2) in comparison with the clarification of removed water by the FDH-1 commercial formulation. On the other hand, the micrograph of the untreated crude oil (blank) displays an emulsion with low polydispersity and with a droplet size ranging from about 0.1 to 0.7 μm, which can be related with the amount of asphaltenes present in the crude oil, because they can stabilize smaller water droplets. Regarding the micrograph of the crude oil dosed with the BHA-911 bipolymer, only the presence of organic agglomerates—possibly paraffins—is observed; for this reason, the total removal of the emulsified water is confirmed. Finally, the micrograph corresponding to the sample of crude oil treated with the FDH-1 commercial formulation presents a remnant emulsion with a smaller distribution of water droplet size from 0.3 to 0.6 μm, that is, a system with a lower polydispersity than that present in the blank sample.

Figure 3:
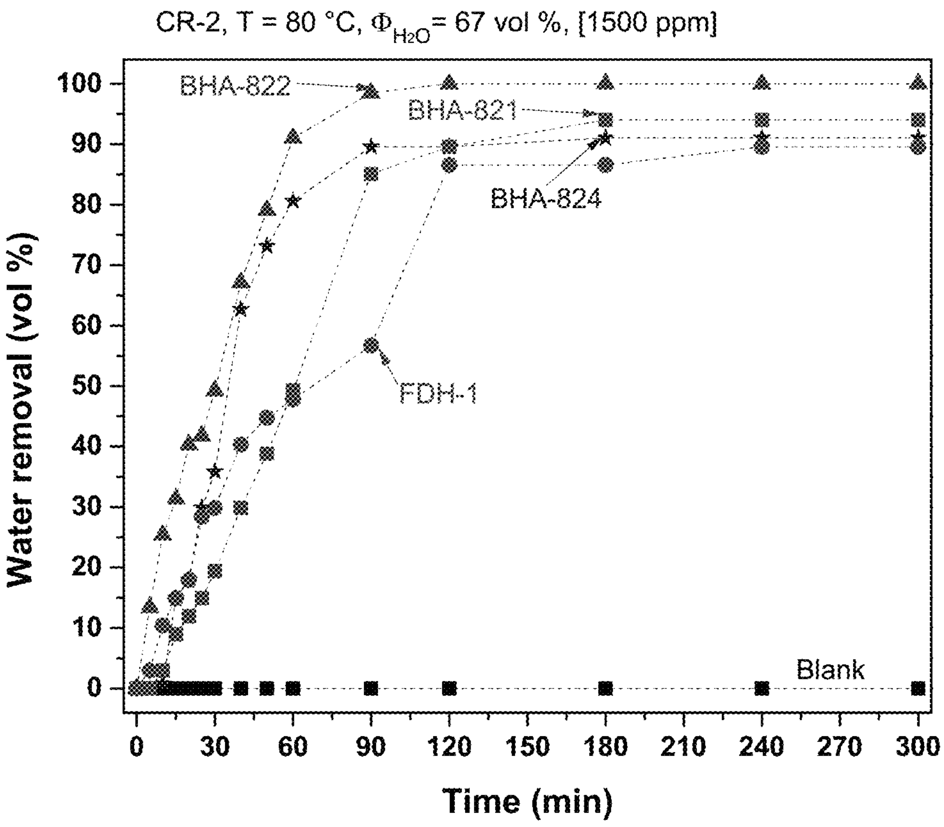
FIG. 3 exposes the performance of the bipolymers based on alkyl acrylate-hydroxyalkyl acrylate as demulsifying agents, with an alkyl acrylate/hydroxyalkyl acrylate weight ratio of 80/20% wt/wt, synthesized with 1, 2 and 4 wt % of chain transfer agent; as well as the FDH-1 commercial formulation. The demulsifying agents were evaluated in the CR-2 extra-heavy crude oil of 7.6° API at a dosage of 1500 ppm.

FIG. 3 displays the performance of random bipolymers with a monomeric weight ratio of alkyl acrylate/hydroxyalkyl acrylate of 80/20% wt/wt, synthesized with 1, 2, and 4 wt % of chain transfer agent—BHA-821, BHA-822, and BHA-824, respectively—, assessed in the CR-2 crude oil (7.6° API) at a dosage of 1500 ppm. It can be observed that the BHA-822 bipolymer with $\overline{M}_n$=13 120 g mol$^{-1}$—medium chain length—shows the highest coalescence rate throughout the evaluation, being the only demulsifying agent capable of removing all the emulsified water. Although this crude oil presents the second highest content of asphaltenes, in addition to a high content of saturates and aromatics, the BHA-822 bipolymer is capable of destabilizing more efficiently the layer of paraffins and asphaltenes that surrounds the water droplets and induce their coalescence. On the other hand, the BHA-824 acrylic bipolymer with $\overline{M}_n$=10 996 g mol$^{-1}$—shortest chain length—displayed a slightly lower coalescence rate than the BHA-822 bipolymer; however, at 90 min reached its maximal removal efficiency of 91 vol %. It should be noted that, although the BHA-821 bipolymer with $\overline{M}_n$=18 061 g mol$^{-1}$—long chain length—showed the lowest coalescence rate during the first hour of assessment, at 90 min, it had already surpassed the FDH-1 formulation, reaching a maximum removal of 94 vol %. Finally, the FDH-1 commercial formulation exhibited a coalescence rate similar to that of the BHA-821 bipolymer during the first 20 min; nevertheless, at the end of the assessment it removed 1 vol % less of emulsified water than the bipolymer. In this sense, for the CR2-crude oil, it can be clearly appreciated that, together with an appropriate monomer weight composition, the number average molecular mass of the random bipolymer based on acrylic plays an important role in the efficiency for the removal of emulsified water. Firstly, a bipolymer of high number average molecular mass—longest chain—, presents a greater difficulty to penetrate the layer of paraffins and asphaltenes that surround the water droplets, because of a greater hindrance steric, therefore, the performance to induce the droplet coalescence decreases. On the contrary, a random bipolymer with a number average molecular mass overly low—shortest chain length—, although it can penetrate the layer of paraffins and asphaltenes, due to its lower molecular volume, it is not capable of causing the complete destabilization of the layer of paraffins and asphaltenes, which is reflected in a lower removal efficiency. Finally, a random bipolymer with a suitable number average molecular mass for the crude oil to be treated, promotes the destabilization of the layers of paraffins and asphaltenes with greater efficiency, for this reason, a greater coalescence of the water droplets is presented, and therefore, a greater amount of removed water.

Figure 4:
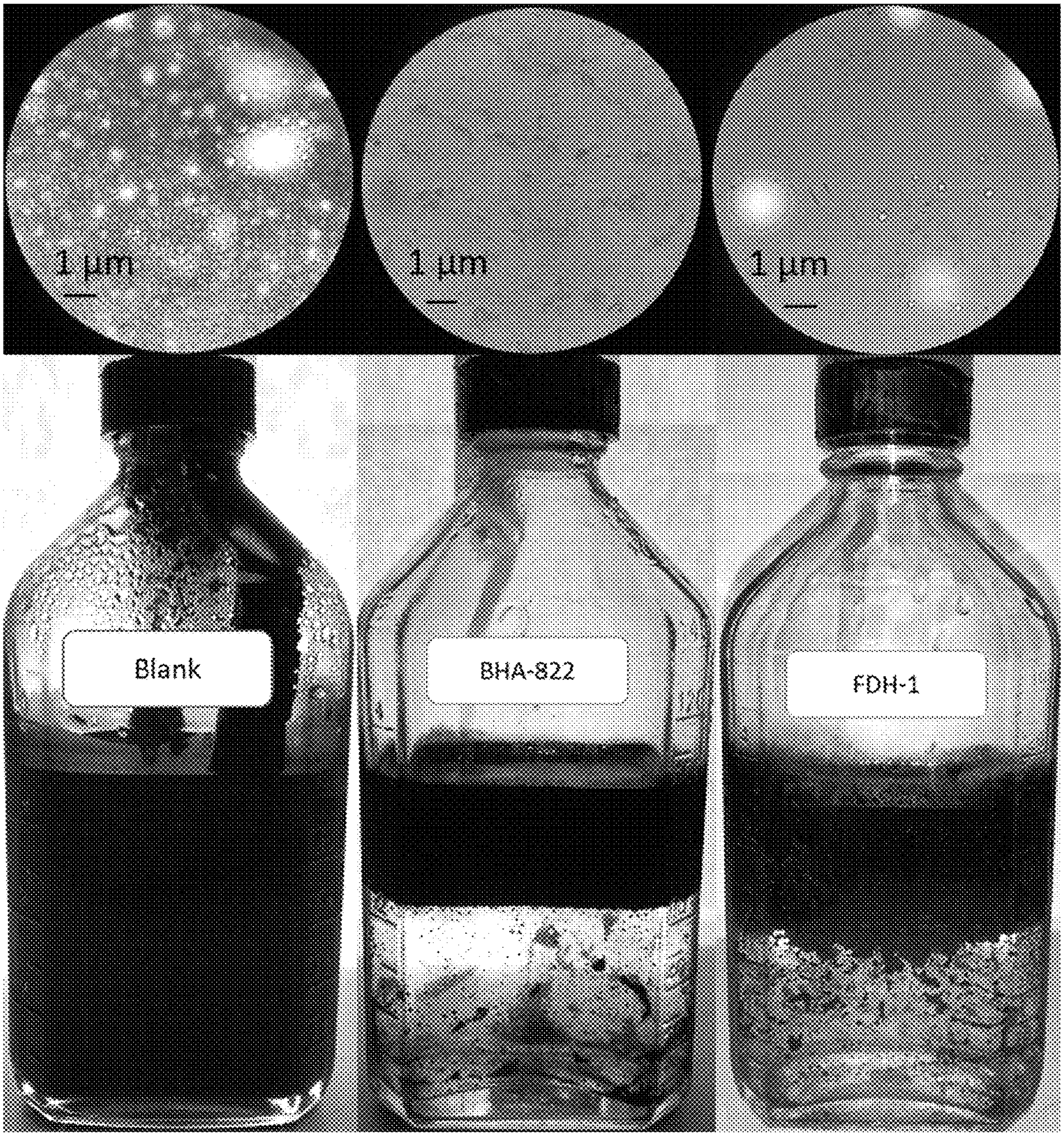
FIG. 4 shows the images of the bottles and the micrographs of the remaining emulsion after the assessment of demulsifier agent in the CR-2 extra-heavy crude oil of 7.6° API. It is compared the blank sample with the crude oil samples treated with the BHA-822 random bipolymer (which achieved removal of 100 vol % of the emulsified water), and with the FDH-1 commercial formulation (90 vol %).

FIG. 4 displays the well-defined interface generated by the BHA-822 bipolymer, which can be contrasted with that obtained with the FDH-1 commercial formulation, where it is clear that there is still residual emulsion. Regarding the optical micrographs, the untreated crude oil sample—without demulsifying agent—presents a high polydispersity in droplet size from about 0.1 to 2.5 μm. It is notable that the droplet size present in this crude oil compared with that observed in the CR-1 crude oil is due to the greater amount of asphaltenes presents in the CR-2 crude oil, which allows stabilizing larger water droplets. In the micrograph of the crude oil sample dosed with the BHA-822 bipolymer, the total removal of emulsified water is confirmed, showing the presence of organic matter, possibly dispersed asphaltenic sludges. In the case of crude oil treated with the FDH-1 commercial formulation, the micrograph allows observing droplets of up to 1.9 μm. Normally, a good demulsifier is capable of removing this droplet size, as happens when the BHA-822 bipolymer is dosed, therefore, it is notorious the lower performance of the FDH-1 commercial formulation as coalescer. Lastly, it is visible the difference in the removed water-crude oil interface obtained with the BHA-822 random bipolymer compared with FDH-1 commercial formulation, where the interface is non-homogeneous, mainly because of the presence of emulsified water droplets in this area.

Figure 5:
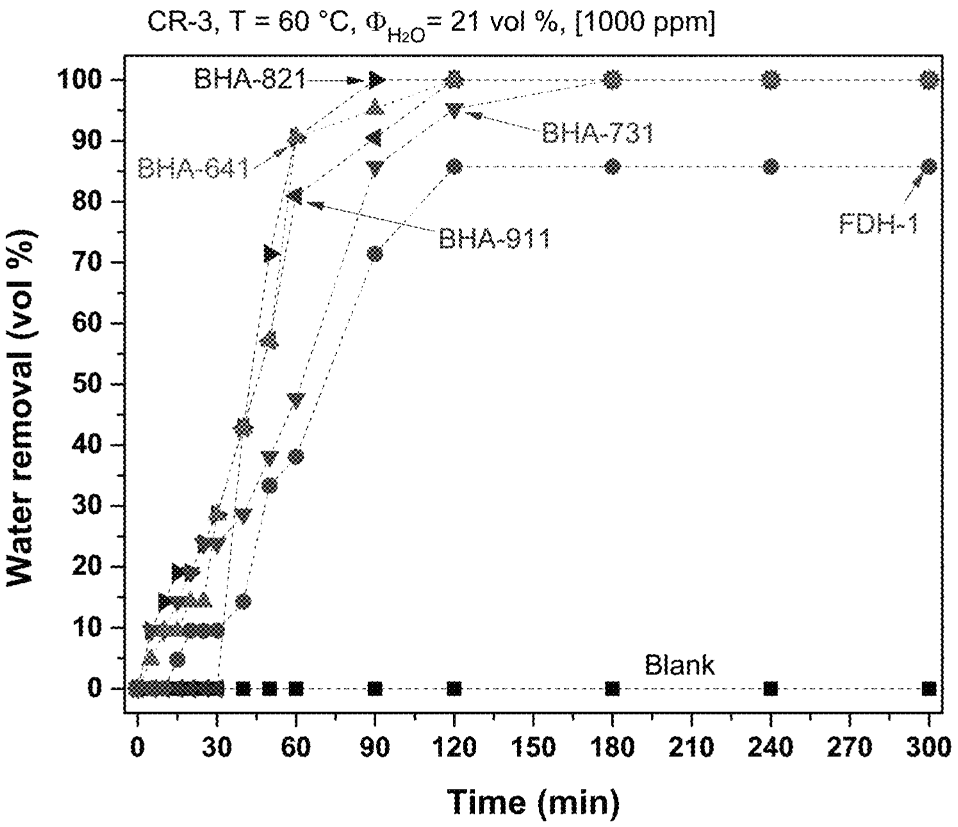
FIG. 5 displays the performance as demulsifying agents of the random bipolymers based on alkyl acrylate-hydroxyalkyl acrylate synthesized with different monomeric weight ratio and with 1 wt % of chain transfer agent, compared with the FDH-1 commercial formulation. Demulsifying agents were evaluated in the CR-3 heavy crude oil of 13.6° API at a dosage of 1000 ppm.

FIG. 5 depicts the demulsifying performance of the random bipolymers based on alkyl acrylate—hydroxyalkyl acrylate, synthesized with 1 wt % of chain transfer agent (BHA-1 series bipolymers) and the FDH-1 commercial formulation, assessed in the CR-3 crude oil (13.6° API) at a dosage of 1000 ppm. All bipolymers of the BHA-1 series could achieve the total removal of the emulsified water. In this sense, the BHA-821 bipolymer showed the highest coalescence rate, reaching 100 vol % at 90 min, followed by the BHA-641 and BHA-911 bipolymers at 120 min. It is important to mention that even though this last bipolymer induced the emulsion breakdown up to 40 min, later, this exhibited an excellent coalescence rate. The BHA-731 bipolymer presented the lowest coalescence rate of all random bipolymers, reaching 100 vol % up to 180 min of the assessment. In contrast, the FDH-1 commercial formulation displayed a low coalescence rate throughout the evaluation, stagnating at a maximal removal of 85 vol % at 120 min.

Figure 6:
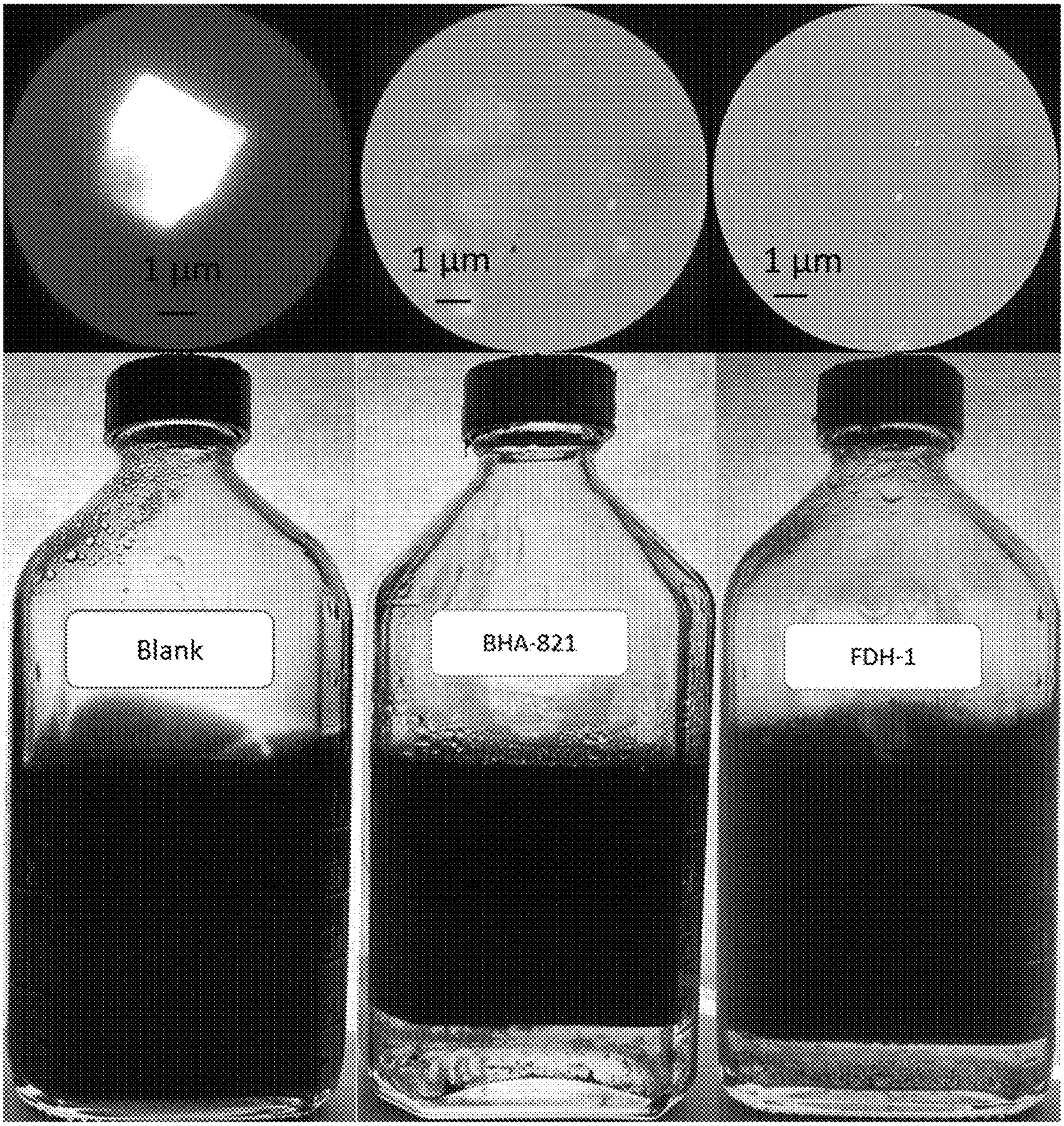
FIG. 6 shows the images of the bottles and the micrographs of crude oil samples after the assessment of random bipolymers based on alkyl acrylate-hydroxyalkyl acrylate in the C3 heavy crude oil of 13.6° API. It is compared the blank sample with the BHA-821 random bipolymer (which exhibits the highest coalescence rate reaching the 100 vol % in less time than the rest of BHA bipolymers, as well as, an excellent clarification of the removed water), and with the FDH-1 commercial formulation (only 86 vol % of removed water).

FIG. 6 shows the bottle images and micrographs after the assessment with the demulsifying agents. In first instance, it is not observed the presence of removed water in the bottle of untreated crude oil (without demulsifying agent (blank)); therefore, the colloidal system is stable under the assessment conditions. Regarding the blank's micrograph, it is appreciated a system with low polydispersity, where the droplet size is found around of 0.1 μm. In addition to this, it is perceptible the presence of a salt crystal, with an approximate width of 2.9 μm. On the other hand, the absence of remaining emulsion is visible in the micrograph of crude oil after the treatment with the BHA-821 random bipolymer, although the presence of paraffin agglomerates is notable. In the case of the crude oil treated with the FDH-1 commercial formulation, a small amount of emulsified water can be observed, in a low polydispersity system with a droplet size around of 0.2 μm. Finally, despite that both the BHA-821 bipolymer and the FDH-1 commercial formulation generate a well-defined interface, it is possible to appreciate that the clarification of the removed water by the BHA-821 bipolymer—as well as that of the BHA-911, BHA-731, and BHA-641 bipolymers, although these are not shown in the FIG. 6—, is markedly superior to that of the FDH-1 commercial formulation.

Figure 7:
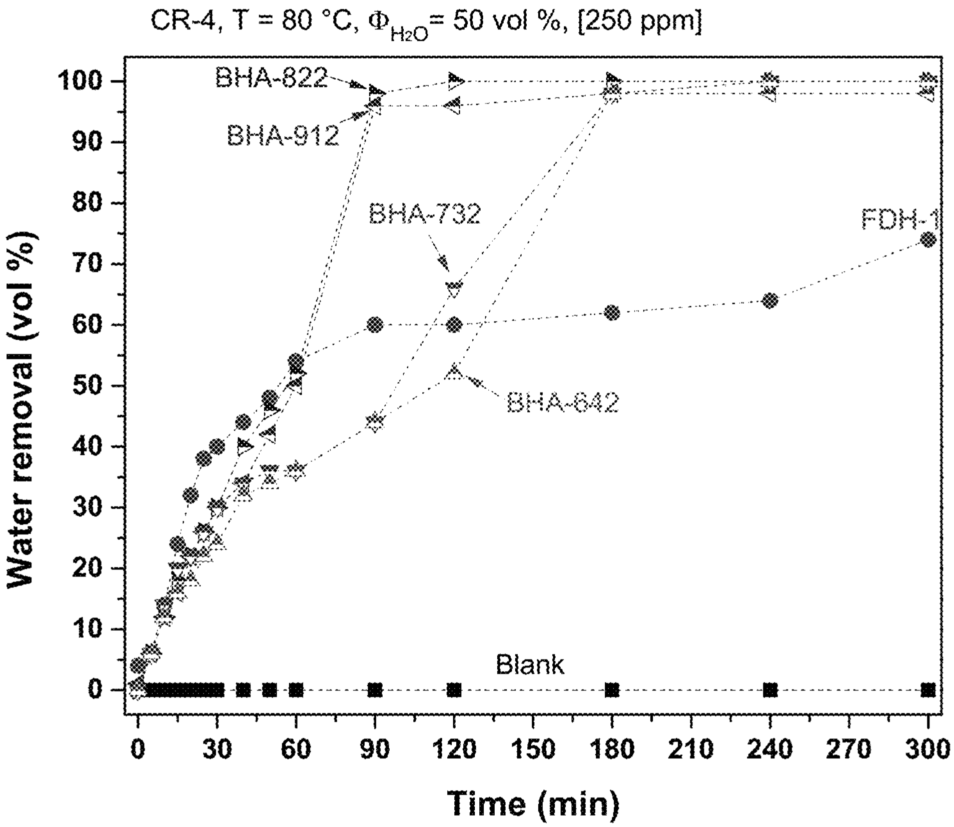
FIG. 7 displays the performance as demulsifying agents of the random bipolymers based on alkyl acrylate-hydroxyalkyl acrylate, synthesized with different monomeric weight ratio and with 2 wt % of chain transfer agent, compared with the FDH-1 commercial formulation. The demulsifying agents were evaluated in the CR-4 light crude oil of 37.3° API at a dosage of 250 ppm.
Figure 8:
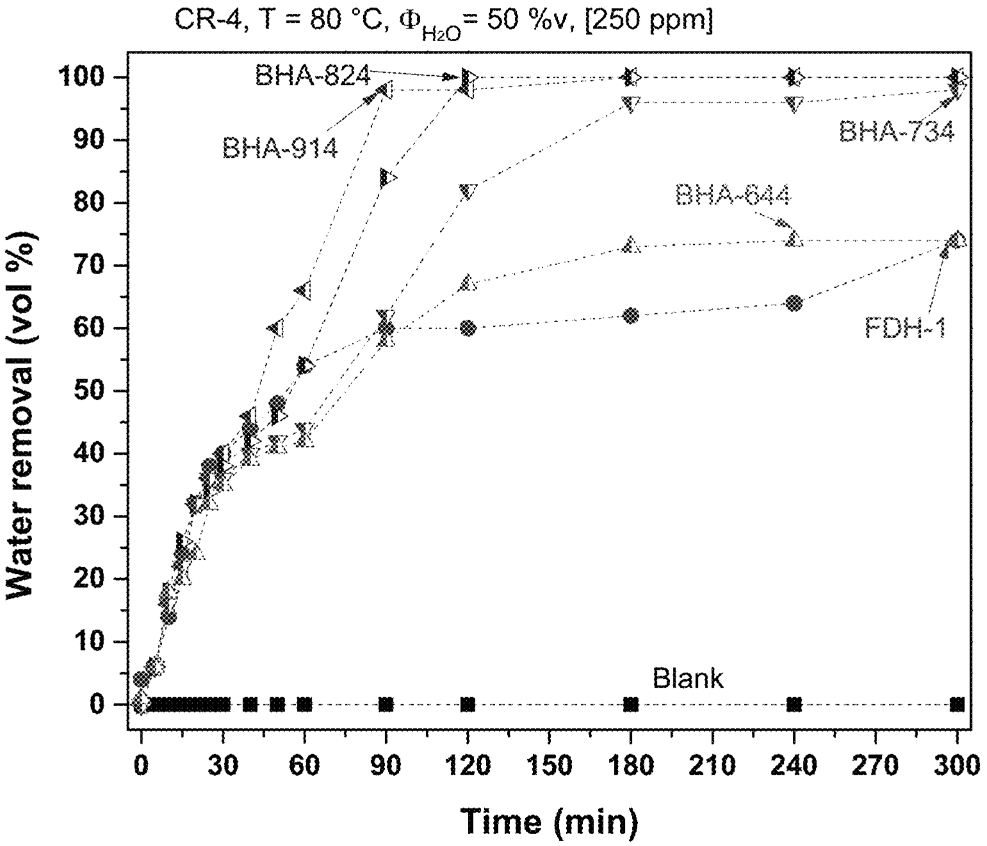
FIG. 8 displays the performance as demulsifying agents of the random bipolymers based on alkyl acrylate-hydroxyalkyl acrylate, synthesized with different monomeric weight ratio and 4 wt % of chain transfer agent, compared with the FDH-1 commercial formulation. All demulsifying agents were evaluated in the CR-4 light crude oil of 37.3° API at a dosage of 250 ppm.

The bipolymers based on alkyl acrylate-hydroxyalkyl acrylate synthesized with 2 wt % (BHA-2 series bipolymer) and 4 wt % (BHA-4 series bipolymer) of chain transfer agent were assessed in the CR4 light crude oil (37.3° API) at a dosage of 250 ppm (FIGS. 7 and 8, respectively). As can be appreciated in the FIG. 7, the FDH-1 formulation presented the highest coalescence rate during the first 60 min—higher amount of removed water—; however, at 90 min of assessment, the performance of the BHA-822 and BHA-912 bipolymers were superior, reaching a final removal of 100 vol %—120 min—and 98 vol %—180 min—, respectively. On the other hand, even though the BHA-732 and BHA-642 bipolymers showed low coalescence rates tan the FDH-1 commercial formulation during the first 90 min of assessment, these achieved the total removal of emulsified water at 240 min, surpassing the FDH-1 commercial formulation, which barely reached to remove 74 vol % of the emulsified water.

FIG. 8 shows the performances as demulsifying agents of the random bipolymers based on alkyl acrylate—hydroxyalkyl acrylate synthesized with 4 wt % of chain transfer agent (BHA-4 series bipolymer), assessed in the CR-4 light crude oil (37.3° API) at a dosage of 250 ppm. As can be appreciated, the BHA-824 and BHA-914 bipolymers displayed the highest coalescence rate, reaching the total removal of the emulsified water at 120 and 180 min, respectively. It should be noted that the BHA-734 bipolymer presented a good performance as coalescer, reaching a maximal removal of 98 vol %. These three acrylic bipolymers notably exceeded the efficiency of the FDH-1 commercial formulation, which barely removed 74 vol %, as made by the BHA-644 bipolymer.

Figure 9:
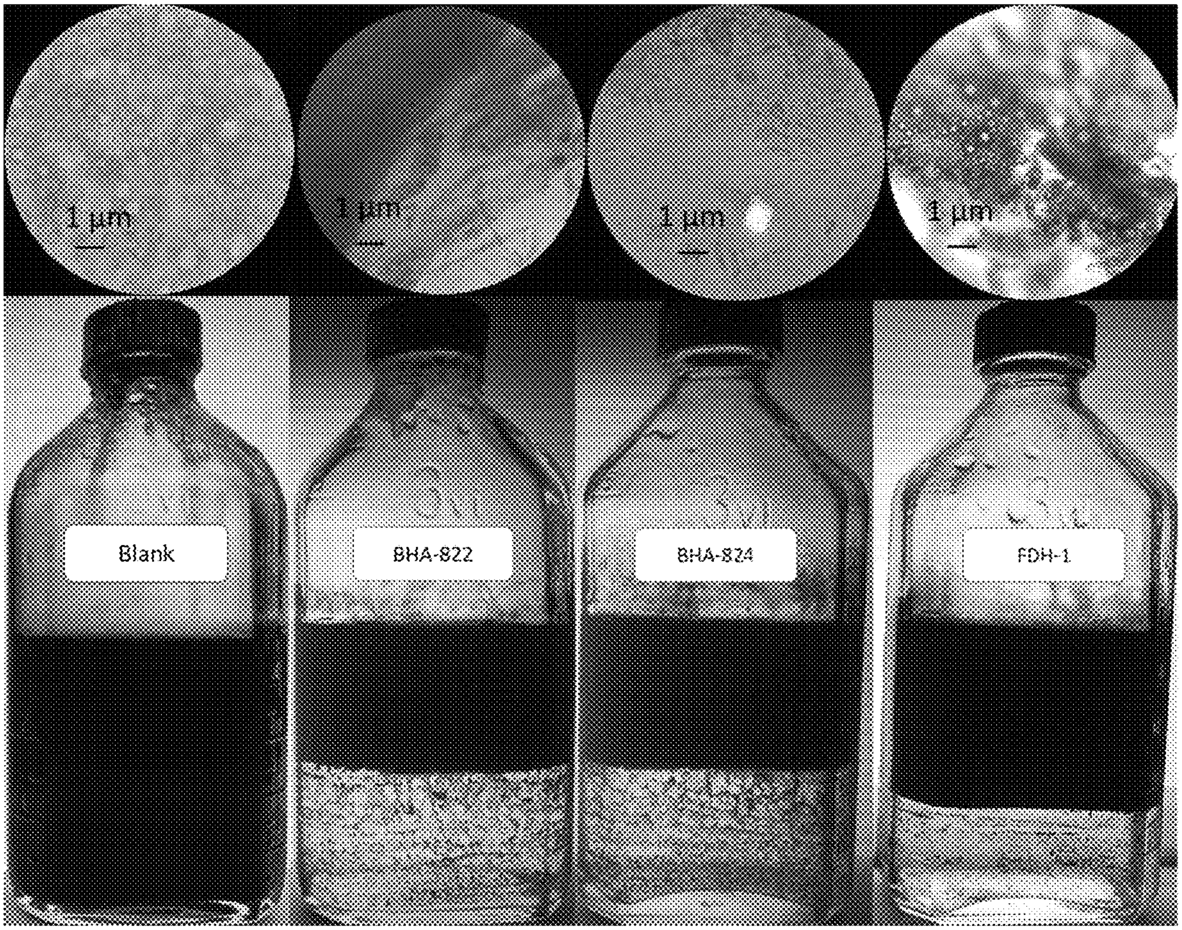
FIG. 9 exhibits the images of the bottles and the micrographs of crude oil after the assessment of the random bipolymers based on alkyl acrylate-hydroxyalkyl acrylate in the CR-4 light crude oil of 37.3° API. Regarding the assessment described in the FIGS. 7 and 8, it is compared with the crude oil without demulsifying agent (blank), with the BHA-822 random bipolymer (which achieved removal of 100 vol % of the emulsified water before than the BHA-912, BHA-732 and BHA-642 bipolymers, with a clarification of removed water similar in all the cases (the images of the bottles of the latter are not shown)), with the BHA-824 bipolymer (which achieved removal of 100% v of the emulsified water before than the BHA-914 bipolymer), and also with the FDH-1 commercial formulation (which scarcely reached 74 vol % of removal of emulsified water).

The bottle images and the micrographs of FIG. 9 correspond to the untreated crude oil (without demulsifying agent (blank)) the crude oil dosed with the BHA-822 and BHA-824 random bipolymers—the first ones to remove all the emulsified water—, respectively; and finally, the crude oil dosed with the FDH-1 commercial formulation. As can be observed, the BHA-822 and BHA-824 acrylic bipolymers, as well as the FDH-1 commercial formulation bring about a removed water-crude oil interface completely homogeneous and well-defined. On the other hand, the clarification of the removed water by the BHA-822 and BHA-824 random bipolymers based on alkyl acrylate-hydroxyalkyl acrylate—including the rest of the random bipolymers of the BHA-2 and BHA-4 series that are not shown in the FIG. 9—, is slightly superior to the clarification of the removed water by the FDH-1 commercial formulation.

Regarding the micrographs, the crude oil without demulsifying agent presents a highly polydisperse emulsion with droplet size between about 0.01 and 0.60 μm. On the other hand, the treated crude oil samples with the BHA-822 and BHA-824 bipolymers do not present remanent emulsion; organic aggregates are only observed, possibly asphaltenes. In the case of the micrograph of the treated crude oil with the FDH-1 commercial formulation is notorious the presence of remaining emulsion displaying a low polydispersity system with a droplet size between 0.1 and 0.7 μm. It should be highlighted that in this last one, an organic matter film can be seen surrounding the droplets, which indicates that the commercial formulation of polyethers is not capable of displacing this barrier to allow the coalescence of the water droplets.

Figure 10:
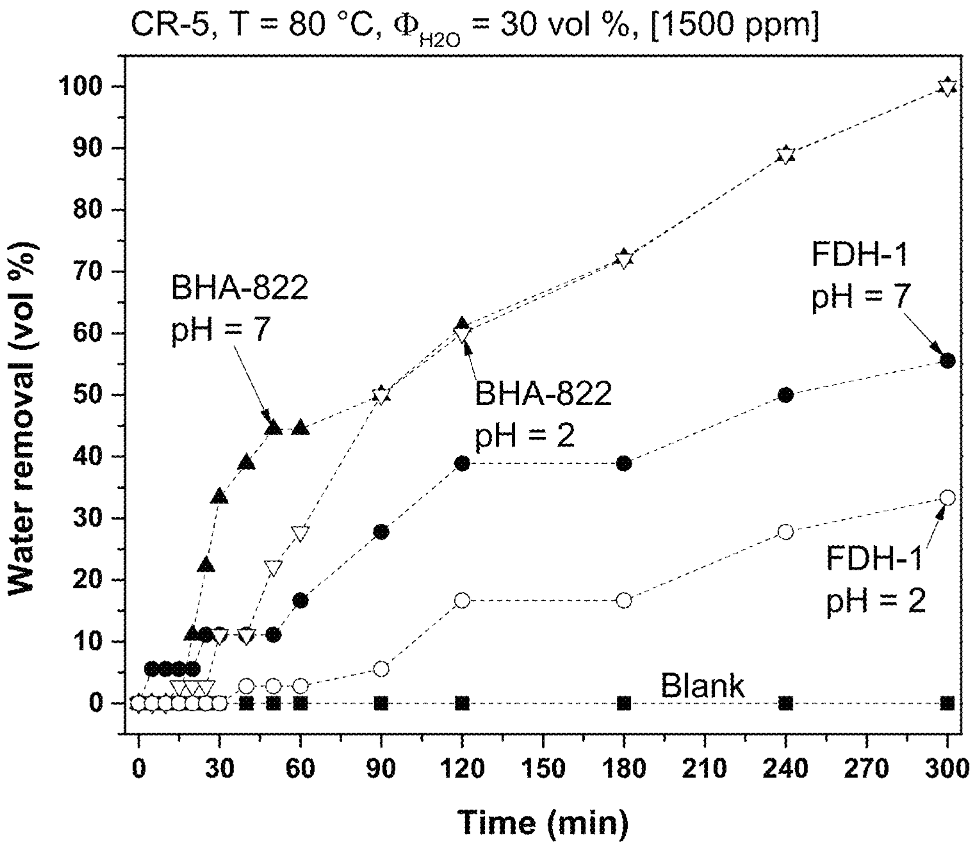
FIG. 10 shows the performance as demulsifying agents of the BHA-822 bipolymer and the FDH-1 commercial formulation at a dosage of 1500 ppm in the CR-5 crude oil of 15.2° API, at a pH=7 (solid-filled symbols) and at a pH=2 (unfilled symbols).

FIG. 10 displays the demulsifying performance of the BHA-822 random acrylic bipolymer compares with the FDH-1 commercial formulation assessed in the CR-5 heavy crude oil (15.2° API) at pH=7 and pH=2, evaluating a dosage of 1500 ppm. It can be observed that under non-acid conditions—pH=7—, until the 60 min of assessment, the BHA-822 bipolymer exhibits a higher coalescence rate in comparison with the acid conditions—pH=2—. This difference is mainly due to the fact that in acid conditions, the asphaltene layer is agglomerated with greater force, which forms a barrier that is more difficult to destabilize. From 90 min to the end of the evaluation, the coalescence rate is similar in both systems, being capable the BHA-822 bipolymer of completely removing the emulsified water 300 min of the test. In contrast, besides that the FDH-1 formulation only removes 56 vol % of the emulsified water under non-acid conditions, the performance as demulsifier decreases to 23% at pH=2. Thus, the high chemical stability of the random alkyl acrylate-hydroxyalkyl acrylate bipolymers of the present disclosure are demonstrated, in addition to their excellent performance in the water removal. While the foregoing disclosure describes the inventions in some detail by way of example and illustration for purposes of clarity and understanding, this disclosure including the examples, descriptions, and embodiments described herein are for illustrative purposes, are intended to be exemplary, and should not be construed as limiting the inventions. It will be clear to one skilled in the art that various modifications or changes to the examples, descriptions, and embodiments described herein can be made and are to be included within the spirit and purview of this disclosure and the appended claims. Further, one of skill in the art will recognize a number of equivalent methods and procedure to those described herein. All such equivalents are to be understood to be within the scope of the present disclosure and are covered by the appended claims.

The disclosures of all publications, patent applications, patents, or other documents mentioned herein are expressly incorporated by reference in their entirety for all purposes to the same extent as if each such individual publication, patent, patent application or other document were individually specifically indicated to be incorporated by reference herein in its entirety for all purposes and were set forth in its entirety herein. In case of conflict, the present specification, including specified terms, will control.

References

[1] Goldszal, A.; Bourrel, M. *Demulsification of crude oil emulsions: Correlation to microemulsion phase behavior.* Ind. Eng. Chem. Res. 2000, 39 (8), 2746-2751.

[2] Li, X; Lin, H; Wu, G.; Sun, W.; Hong, L; Sui, H. *Operational parameters, evaluation methods, and fundamental mechanisms: aspects of nonaqueous extraction of bitumen from oil sands.* Energy Fuels 2012, 26 (6), 3553-3563.

[3] Kokal, S. L; Maini, B. B.; Woo, R. *Flow of emulsions in porous media. In Emulsions: Fundamentals and Appli-*

*cations in the Petroleum Industry.* Schramm, L. L. Ed, ACS: Washington, DC, 1992; Vol 231, pp. 37,40.

[4] Becker, J. R. *Crude oil waxes, emulsions and asphaltenes.* PenWell Corporation: Tulsa, Oklahoma, 1997; pp. 9, 80.

[5] Zhang, L; He, G; Ye, D; Zhan, N; Guo, Y; Fang. W. *Methacrylated hyperbranched polyglycerol as a high-efficiency demulsifier for oil-in-water emulsions.* Energy Fuels 2016, 30 (11), 9939-9946.

[6] Ezzat, A. O; Atta, A. M; Al-Lohedan, H. A; Abdullah, M. M. S; Hashem, A. I. *Synthesis and application of poly(ionic liquid) based on cardanol as demulsifier for heavy crude oil water emulsions.* Energy Fuels 2018, 32 (1), 214-225.

[7] Allan, B. W. *Demulsifying petroleum emulsions with aryl sulfonates-oxyalkylated phenol formaldehyde resins and alkali metal halides.* U.S. Pat. No. 4,299,690. Nov. 10, 1981.

[8] Niu, Z; Yue, T; He, X; Manica, R. *Changing the interface between an asphaltene model compound and water by addition of an EO-PO demulsifier through adsorption competition or adsorption replacement.* Energy Fuels 2019, 33 (6), 5035-5042.

[9] Yang, B; Guo, C; Chen, S; Ma, J; Wang, J; Liang, X; Zheng, L; Liu, H. *Effect of acid on the aggregation of poly(ethylene oxide)-poly(propylene oxide)-poly(ethylene oxide) block copolymers.* J. Phys. Chem. B 2006, 110(46), 23068-23074.

[10] Estrada Buendia, A; Lozada y Cassou, M; Cendejas Santana, G; Flores Oropeza, E. A; Castro Sotelo, L. V; Vazquez Moreno, F. S. *Formulaciones desemulsificantes y deshidratantes para crudos pesados a base de copolimeros en bloques bifuncionalizados con aminas.* Mexican Patent No. 301344 B. Jun. 27, 2012.

[11] Cendejas Santana, G; Flores Oropeza, E. A; Castro Sotelo, L. V; Estrada Buendía, A; Lozada y Cassou, M; Vázquez Moreno, F. S. *Demulsifying and dehydrating formulations for heavy crude oils based on block copolymers bifunctionalized with amines.* U.S. Pat. No. 8,815,960 B2. Aug. 26, 2014.

[12] López Ortega, A; Estrada Buendía, A; Estrada Martínez, A; Flores Sandoval, C. A; Flores Oropeza, E. A; Álvarez Ramírez, F; Vázquez Moreno, F. S; Hernández Cortez, J. G; Castro Sotelo, L. V; Reyes Martínez, R. *Proceso de escalamiento de copolimeros tribloque bifuncionalizados con aminas secundarias y terciarias, con aplicación en la deshidratación y desalado de aceites crudos pesados.* Mexican Patent No. 368308 B. Sept. 26, 2019.

[13] Flores Sandoval, C. A; Flores Oropeza, E. A; López Ortega, A; Hernández Cortez, J. G; Estrada Buendía, A; Castro Sotelo, L. V; Reyes Martínez, R; Álvarez Ramírez, F; Estrada Martínez, A; Vázquez Moreno, F. S. *Scale-up process of bifunctionalized triblock copolymers with secondary and tertiary amines, with application in dewatering and desalting of heavy crude oils.* U.S. Pat. No. 10,125,226 B2. Nov. 13, 2018.

[14] Flores Sandoval, C. A; Flores Oropeza, E. A; López Ortega, A; Hernández Cortez, J. G; Estrada Buendía, A; Castro Sotelo, L. V; Reyes Martínez, R; Álvarez Ramírez, F; Estrada Martínez, A; Vázquez Moreno, F. S. *Scale-up process of bifunctionalized triblock copolymers with secondary and tertiary amines, with application in dewatering and desalting of heavy crude oils.* Canadian Patent No. CA 2852863 C. Nov. 8, 2016.

[15] Flores Oropeza, E. A; Castro Sotelo, L. V; López Ortega, A; Hernández Cortez, J. G; Álvarez Ramírez, F; Estrada Martínez, A; Vázquez Moreno, F. S. *Synergistic formulations of functionalized copolymers and ionic liquids for dehydrated and desalted of medium, heavy and extra heavy crude oils.* U.S. Pat. No. 9,650,577 B2. May 16, 2017.

[16] López Ortega, A; Flores Sandoval, C. A; Zamora Guerrero, E. B; Álvarez Ramírez, F; Vázquez Moreno, F. S; Zavala Olivares, G; Fuentes Santiago, J. V. *Bipolimeros tribloques POE-POP-POE, con terminaciones anfotéricas, como agentes desemulsionantes de aceites crudos pesados.* Mexican Patent Application No. MX/a/2019/005132. May 2,2019.

[17] Flores Sandoval, C. A; Vázquez Moreno, F. S; López Ortega, A; Álvarez Ramírez, F; Zavala Olivares, G; Fuentes Santiago, J. V. Zamora Guerrero, E. B. *PEO-PPO-PEO triblock bipolymers, with amphoteric endings, as demulsifying agents for heavy crude oils.* U.S. Pat. No. 11,261,282 B2. Mar. 1, 2022.

[18] Fuentes, J. V; Zamora, E. B; Mariath, R; Li, Z; Xu, Z; Vázquez, F; Flores, C. *Dehydrating heavy crude oils with new amphoteric block bipolymers.* Energy Fuels 2020, 34 (4), 4307-4317.

[19] Teng, H; Chen, C; Yan, S; Ye, D; Zhang, L. *Modified hyperbranched polyethyleneimine as a novel demulsifier for oil-in-water emulsions.* Energy Fuels 2019, 33 (10), 10108-10114.

[20] Yan, S; He. G; Ye, D; Guo, Y; Fang, W. *Amphiphilic hyperbranched polyethyleneimine for highly efficient oil-water separation.* J. Mater. Chem. A 2020, 8(5), 2412-2423.

[21] Wang, C; Fang. S; Duan, M; Ziong, Y; Ma. Y; Chen, W. *Synthesis and evaluation of demulsifiers with polyethyleneimine as accepter for treating crude oil emulsions.* Polym. Adv. Technol. 2015, 26 (5), 442-448.

[22] Li. Z; Geng, H; Wang, X; Jing, B; Liu, Y; Tan, Y. *Novel tannic acid-based polyether as an effective demulsifier for water-in-aging crude oil emulsions.* Chem. Eng. J. 2018, 354, 1110-1119.

[23] Li, Z; An, S; Liu, Y; Hua, Z; Li, F; Wang, X; Jing, B; Tan, Y. *Practical modification of tannic acid polyether demulsifier and its highly efficient demulsification for water-in-aging crude oil emulsions.* ACS Omega 2019, 4 (24), 20697-20707.

[24] Yu, M. H; Wang, S. X; Fang, H. H; Sheng, M. J; Cai, Y. *A dispersion of (meth)acrylate copolymer containing a hydroxyalkyl (meth)acrylate functional monomer unit for flexible cementitious waterproofing materials.* U.S. Patent Application No. 2018/0179108. Jun. 28, 2018.

[25] Hall, R. P. *Curing by actinic radiation.* U.S. Pat. No. 3,899,611. Aug. 12, 1975.

[26] Guttag, A. *Microorganisms.* U.S. Pat. No. 3,767,790. Oct. 23, 1973.

[27] Vijn, J. P; Veld, P. *Low dosage polymeric naphthenate inhibitors.* U.S. Pat. No. 9,567,509 B2. Feb. 14, 2017.

[28] Hernández Carbajal, E. I; Cevada Maya, E; López Ortega, A; Flores Sandoval, C. A; Álvarez Ramírez, F; Estrada Martínez, A; Vázquez Moreno, F. S. *Formulaciones de copolímeros base acrilatos de alquilo empleadas como antiespumantes en aceites crudos pesados y super-pesados.* Mexican Patent No. 383630 B. Jun. 8, 2021.

[29] Hernández Carbajal, E. I; López Ortega, A; Flores Sandoval, C. A; Álvarez Ramírez, F; Clavel López, J. C; Vázquez Moreno, F. S; Cevada Maya, E. *Formulations of terpolymers based on alkyl acrylates employed as antifoaming of gasified heavy and super-heavy crude oils.* U.S. Pat. No. 10,982,031 B2. Apr. 20, 2021.

[30] Hernández Carbajal E. I; Cevada Maya, E; López Ortega, A; Flores Sandoval, C. A; Álvarez Ramírez, F; Estrada Martínez, A; Vázquez Moreno, F. S. *Formulations of*

*copolymers based on alkyl acrylates used as defoamers of heavy and super-heavy crude oils.* U.S. Pat. No. 10,221,349 B2. Mar. 5, 2019.

[31] Debord, J. D. *Polymers useful as demulsifiers and clarifiers.* U.S. Pat. No. 9,981,207 B2. May 29, 2018.

[32] Jakubowski, W. *Copolymers useful as water clarifiers and for water-oil separation.* U.S. Pat. No. 11,001,764 B2. May. 11, 2021.

[33] Young, K. L; Ayers, C. M; Hoyles, S. M. *Composition and method for oilfield water clarification processes.* U.S. Patent Application No. 2020/0056105 A1. Feb. 20, 2020.

[34] Stephenson, W. K. *Alkoxylated vinyl polymer demulsifiers.* U.S. Pat. No. 4,968,449. Nov. 6, 1990.

[35] Flores Sandoval C. A; Chávez Mora, M. A; Zamora Guerrero, E. B; López Ortega, A; Zavala Olivares, G; Álvarez Ramírez, F; Vázquez Moreno, F. S. *Water/crude oil removers based on alkylacrylic-carboxyalkyl acrylic random copolymers of controlled molecular mass.* U.S. Pat. No. 10,793,783 B2. Oct. 6, 2020.

[36] Flores Sandoval C. A; Chávez Mora, M. A; Zamora Guerrero, E. B; López Ortega, A; Zavala Olivares, G; Álvarez Ramirez, F; Vázquez Moreno, F. S. *Water/crude oil removers based on alkylacrylic-carboxyalkyl acrylic random copolymers of controlled molecular mass.* Canadian Patent No. 3013494 C. Dec. 8, 2020.

[37] López Ortega, A; Flores Sandoval, C. A; Hernández Carbajal, E. I; Álvarez Ramírez, F; Vázquez Moreno, F. S; Zavala Olivares, G; Clavel López, J. C; Garcia Jiménez, R. J. *Desemulsionantes para aceites crudos con base en copolímeros aleatorios acrilico-aminoacrílico de masa molecular controlada.* Mexican Patent No. 386485 B. Sep. 15, 2021.

[38] Hernández Carbajal, E. I; Flores Sandoval C. A; Álvarez Ramirez, F; López Ortega, A; García Jiménez, R. J; Clavel López, J. C; Vázquez Moreno, F. S. *Demulsifiers for crude oil based on acrylic-aminoacrylic random copolymers of controlled molecular mass.* U.S. Pat. No. 10,975,185 B2. Apr. 13, 2021.

[39] Palacios, N. (2015). *Synthesis of copolymers based on alkyl acrylate via emulsion polymerization as demulsifying agents in Mexican heavy crude oils.* (Undergraduate thesis). Escuela Superior de Ingeniería Química e Industrias Extractivas, Ciudad de Mexico.

[40] Gómez, E; Fuentes, J. V; Zamora, E. B; Vargas, C. J; Cevada, E; Zavala, G.; Álvarez, F; Flores, C; Vázquez, F. *Bipolímeros de adición con alta aleatoriedad para desestabilización de emulsiones complejas en mezclas de aceites crudos.* Mexican Patent Application No. Mx/a/2020/011505. Oct. 29, 2020.

[41] Gómez, E; Fuentes, J. V; Zamora, E. B; Vargas, C. J; Cevada, E; Zavala, G.; Álvarez, F; Flores, C; Vázquez, F. *Highly random addition bipolymers for destabilization of complex emulsions in crude oil blends.* United States Patent Application No. 20220135886 A1.May 5, 2022.

[42] Fuentes, J. V; Zamora, E. B; Cevada, E; Zavala, G; Vázquez, F. S; Flores, C. A. *Remoción de emulsiones agua-en-aceite crudo empleando macromoléculas de acrilatos hidrofóbicos e hidrofílicos.* Mexican Patent Application No. Mx/a/2021/008781. Jul. 21, 2021.

[43] Lozada y Cassou, M; Flores Oropeza, E. A; Cendejas Santana, G; Castro Sotelo, L. V; Vázquez Moreno, F. S. *Formulación de polímeros aleatorios para mejorar flujo de crudos del petróleo.* Mexican Patent No. 338861 B. Apr. 28, 2016.

[44] Cevada Maya, E., Castro Sotelo, L. V; Hernández Carbajal, E. I; Flores Sandoval, C. A; López Ortega, A; Estrada Buendía, A; Álvarez Ramírez, F; Estrada Martínez, A; Vázquez Moreno, F. S. *Formulaciones de homopolimeros base acrilatos de alquilo empleados como antiespumantes en aceites crudos pesados y súper pesados.* Mexican Patent No. 378417 B. Dic. 14, 2020.

[45] Castro Sotelo, L. V; Flores Oropeza, E. A; Cendejas Santana, G; Lozada y Cassou, M; Vázquez Moreno, F. S. *Formulations of random polymers for improving crude petroleum flow.* U.S. Pat. No. 9,120,885 B2. Sep. 1, 2015.

[46] Cevada Maya, E., Castro Sotelo, L. V; Hernández Carbajal, E. I; Flores Sandoval, C. A; López Ortega, A; Estrada Buendía, A; Álvarez Ramirez, F; Estrada Martínez, A; Vázquez Moreno, F. S *Formulations of homopolymers based on alkyl acrylates used as antifoaming agents in heavy and super-heavy crude oils.* U.S. Pat. No. 10,213,708 B2. Feb. 26, 2019.

[47] Cevada Maya, E., Castro Sotelo, L. V; Hernández Carbajal, E. I; López Ortega, A; Estrada Buendía, A; Álvarez Ramírez, F; Estrada Martínez, A; Vázquez Moreno, F. S; Flores Sandoval, C. A. *Formulations of alkyl acrylate homopolymers used as antifoaming agents in heavy and super heavy crude oils.* Canadian Patent No. 2872382 C. Aug. 8, 2017.

[48] Odian, George. Principles of polymerization. John Wiley & Sons, 2004. Page 248.

[49] Plessis, C., Arzamendi, G., Leiza, J. R., Alberdi, J. M., Schoonbrood, H. A., Charmot, D., & Asua, J. M. (2001). Seeded semibatch emulsion polymerization of butyl acrylate: Effect of the chain-transfer agent on the kinetics and structural properties. Journal of Polymer Science Part A: Polymer Chemistry, 39(7), 1106-1119.

[50] Malik, M. I., Mays, J., & Shah, M. R. (Eds.). (2021). Molecular Characterization of Polymers: A Fundamental Guide. Elsevier. Page 114.

[51] Cowie, J. M. G. (Ed.). (2013). Alternating copolymers. Springer Science & Business Media. Page 2.

[52] Soteros, C. E., and S. G. Whittington. "The statistical mechanics of random copolymers." Journal of Physics A: Mathematical and General 37.41 (2004): R279.

The invention claimed is:

1. A process of dehydrating crude oils by adding a dehydrating agent consisting of a random bipolymer of structural formula (1) having a molar mass of from 2,800 to 63,800 g $mol^{-1}$ to crude oils, wherein the structural formula (1) comprises:

(1)

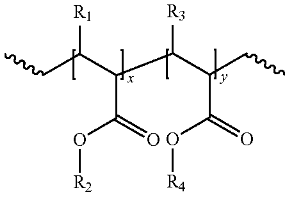

wherein:

$R_1$ and $R_3$ are independently selected from H (hydrogen) and $CH_3$ (methyl);

$R_2$ is independently selected from: $CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di(ethylene glycol)ethylether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylcyclohexyl), $C_{12}H_{25}$ (n-dodecyl), $C_{18}H_{37}$ (n-octadecyl), $C_5H_9O$ (tetrahydrofurfuryl), $C_5H_9O$ (2-tetrahydropyranyl), $C_{13}H_{27}$ (tridecyl), and $C_{22}H_{45}$ (behenyl), where the aliphatic chain can optionally include up to 35 carbon atoms, as well as heteroatoms of the ether group or benzene type aromatic rings;

$R_4$ is independently selected from: $CH_2OH$ (hydroxymethyl), $C_2H_4OH$ (2-hydroxyethyl), $C_3H_6OH$ (3-hydroxypropyl), $C_4H_8OH$ (4-hydroxybutyl), $C_5H_{10}OH$ (5-hydroxypentyl), $C_6H_{12}OH$ (hydroxyhexyl), $C_7H_{14}OH$ (hydroxyheptyl), $C_8H_{16}OH$ (hydroxyoctyl), $C_9H_{18}OH$ (hydroxynonyl), $C_{10}H_{20}OH$ (10-hydroxydecyl), $C_{11}H_{22}OH$ (11-hydroxyundecyl), and $C_{12}H_{24}OH$ (12-hydroxydodecyl), and can optionally include alkyl groups of cyclic or branched-chain from $C_1$ to $C_{22}$;

x is from 1 to 63;

y is from 1 to 63; and wherein the polymeric subunit of x alkyl-acrylate monomers and the polymeric subunit of y hydroxyalkyl-acrylate monomers can be present in any order, and wherein the random bipolymer is synthesized in a single stage by semi-continuous emulsion polymerization.

2. The process according to claim 1, wherein the dehydrating agent is dissolved with organic solvents to form a solution, and the organic solvents for dissolution are selected from the group consisting of: dichloromethane, methanol, ethanol, isopropanol, chloroform acetone, dimethylsulfoxide, tetrahydrofuran, dioxane, benzene and its derivatives, toluene, xylene, aromatic amines, jet fuel, and naphtha.

3. The process according to claim 1, wherein a solution concentration of the dry random biopolymer in an organic solvent solution is an amount between 3 and 55 weight percent.

4. The process according to claim 1, where the dehydrating agent dissolutions are dosed at a concentration from 10 to 2,000 ppm.

5. The process according to claim 1, wherein the alkyl acrylate monomer used to prepare the bipolymer is selected from the group consisting of: methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate, and behenyl methacrylate.

6. The process according to claim 1, wherein the hydroxyalkyl acrylate monomer used to prepare the bipolymer is selected from the group consisting of: hydroxymethyl acrylate, 2-hydroxyethyl acrylate, 3-hydroxypropyl acrylate, 4-hydroxybutyl acrylate, 5-hydroxypentyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 11-hydroxyundecyl acrylate, 12-hydroxydodecyl acrylate, hydroxymethyl methacrylate, 2-hydroxyethyl methacrylate, 3-hydroxypropyl methacrylate, 4-hydroxybutyl methacrylate, 5-hydroxypentyl methacrylate, 6-hydroxyhexyl methacrylate, 7-hydroxyheptyl methacrylate, 8-hydroxyoctyl methacrylate, 9-hydroxynonyl methacrylate, 10-hydroxydecyl methacrylate, 11-hydroxyundecyl methacrylate, and 12-hydroxydodecyl methacrylate.

7. The process according to claim 1, wherein the bipolymer is prepared by adding the monomers from a vessel containing a pre-emulsion with 55 to 99% by weight of the alkyl acrylate monomer and 1 to 45% by weight of the hydroxyalkyl acrylate monomer.

* * * * *